(12) United States Patent
Choi et al.

(10) Patent No.: US 11,533,499 B2
(45) Date of Patent: Dec. 20, 2022

(54) METHOD FOR SIGNALING MIXED NAL UNIT TYPE AND SUBPICTURE PARTITIONING IN CODED VIDEO STREAM

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/095,289

(22) Filed: Nov. 11, 2020

(65) Prior Publication Data
US 2021/0306651 A1    Sep. 30, 2021

Related U.S. Application Data

(60) Provisional application No. 63/003,137, filed on Mar. 31, 2020.

(51) Int. Cl.
| | | |
|---|---|---|
| *H04N 19/46* | (2014.01) | |
| *H04N 19/169* | (2014.01) | |
| *H04N 19/174* | (2014.01) | |
| *H04N 19/82* | (2014.01) | |

(52) U.S. Cl.
CPC .......... *H04N 19/46* (2014.11); *H04N 19/174* (2014.11); *H04N 19/188* (2014.11); *H04N 19/82* (2014.11)

(58) Field of Classification Search
None
See application file for complete search history.

(56) References Cited

U.S. PATENT DOCUMENTS

| | | |
|---|---|---|
| 2014/0064384 A1 | 3/2014 | Wang |
| 2014/0334546 A1 | 11/2014 | Shibahara et al. |
| 2016/0234523 A1 | 8/2016 | Hattori et al. |
| 2021/0297655 A1* | 9/2021 | He .................... H04N 19/70 |
| 2022/0078486 A1* | 3/2022 | Hannuksela ..... H04N 21/26258 |

FOREIGN PATENT DOCUMENTS

WO    WO-2020185962 A1 *   9/2020   ............. H04N 19/31

OTHER PUBLICATIONS

Benjamin Bross et al., "Versatile Video Coding (Draft 8)", Joint Video Experts Team (JVET) of ITU-T SG 16 WP 3 and ISO/IEC JTC 1/SC 29/WG 11, JVET-Q2001-vE, Jan. 7-17, 2020, 511 pages, 17th Meeting, Brussels, BE.*

International Search Report dated Jun. 3, 2021 in International Application No. PCT/US2021/022482.

Written Opinion of the International Searching Authority dated Jun. 3, 2021 in International Application No. PCT/US2021/022482.

(Continued)

*Primary Examiner* — Edemio Navas, Jr.
(74) *Attorney, Agent, or Firm* — Sughrue Mion, PLLC

(57) ABSTRACT

A method, computer program, and computer system is provided for coding video data. Video data including one or more subpictures is received. A network abstraction layer (NAL) unit type associated with each of the one or more subpictures is identified based on checking a flag corresponding to mixed NAL units in the one or more subpictures. The video data is decoded based on the identified NAL unit types.

20 Claims, 24 Drawing Sheets

| pic_parameter_set_rbsp( ) { | Descriptor |
|---|---|
| ... | |
|   mixed_nalu_types_in_pic_flag | u(1) |
| ... | |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   pps_independent_subpics_flag | u(1) |
|   if( !pps_independent_subpics_flag ) { | |
|     if( !subpic_id_mapping_in_pps_flag ) | |
|       pps_num_subpics_minus1 | ue(v) |
|     for( i = 0; i <= pps_num_subpic_minus1; i++ ) { | |
|       subpic_treated_as_pic_flag[ i ] | u(1) |
|       loop_filter_across_subpic_enabled_flag[ i ] | u(1) |
|     } | |
|   } | |
|   ... | |
| } | |

(56) References Cited

OTHER PUBLICATIONS

Choi et al., "AHG9/AHG12: On mixed NAL unit types", Joint Video Experts Team (JVET) of ITU-T SG 16 WP 3 and ISO/IEC JTC 1/SC 29/WG 11, JVET-R0120, 18th Meeting: by teleconference, Apr. 15-24, 2020 (2 pages total).
Extended European Search Report dated May 18, 2022 from the European Patent Office in EP Application No. 21781229.6.
Communication dated Oct. 4, 2022 issued by the Japanese Intellectual Property Office in counterpart Japanese Application No. 2021-561945.
Bejamin Bross, et al., Versatile Video Coding (Draft 8),' Joint Video Experts Team (JVET) of ITU-T SG 16 WP 3 and ISO/IEC JTC 1/SC 29/WG 11, JVET-Q2001-v9, Jan. 7-17, 2020, 13 pages, 17th Meeting, Brussels, BE.

* cited by examiner

Fig. 6

| | |
|---|---|
| tile_group_header( ) { | |
| ... | |
| if(adaptive_pic_resolution_change_flag) { | |
| dec_pic_size_idx | u(1) |
| } | |
| ... | |
| } | |

601 — tile_group_header( ) {
603 — if(adaptive_pic_resolution_change_flag) {
602 — dec_pic_size_idx

| | Descriptor |
|---|---|
| seq_parameter_set_rbsp( ) { | |
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= num_dec_pic_size_in_luma_samples_minus1; i++ ) { | |
| dec_pic_width_in_luma_samples[ i ] | ue(v) |
| dec_pic_height_in_luma_samples[ i ] | ue(v) |
| } | |
| } | |
| ... | |
| } | |

610 — seq_parameter_set_rbsp( ) {
611 — adaptive_pic_resolution_change_flag
612 — if(adaptive_pic_resolution_change_flag) {
613 — output_pic_width_in_luma_samples / output_pic_height_in_luma_samples
614 — reference_pic_size_present_flag
615 — reference_pic_width_in_luma_samples / reference_pic_height_in_luma_samples
616 — num_dec_pic_size_in_luma_samples_minus1
617 — dec_pic_width_in_luma_samples[ i ] / dec_pic_height_in_luma_samples[ i ]

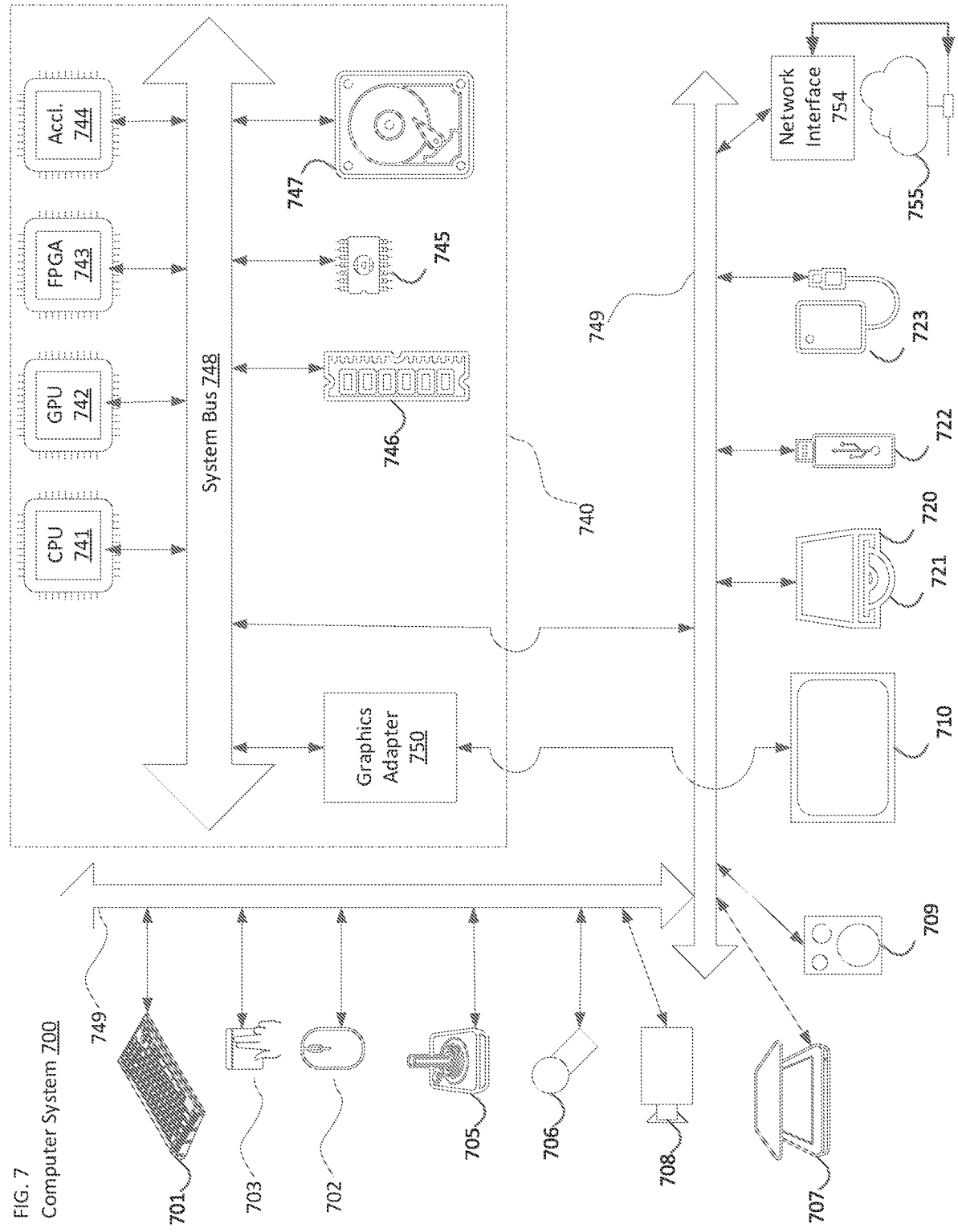

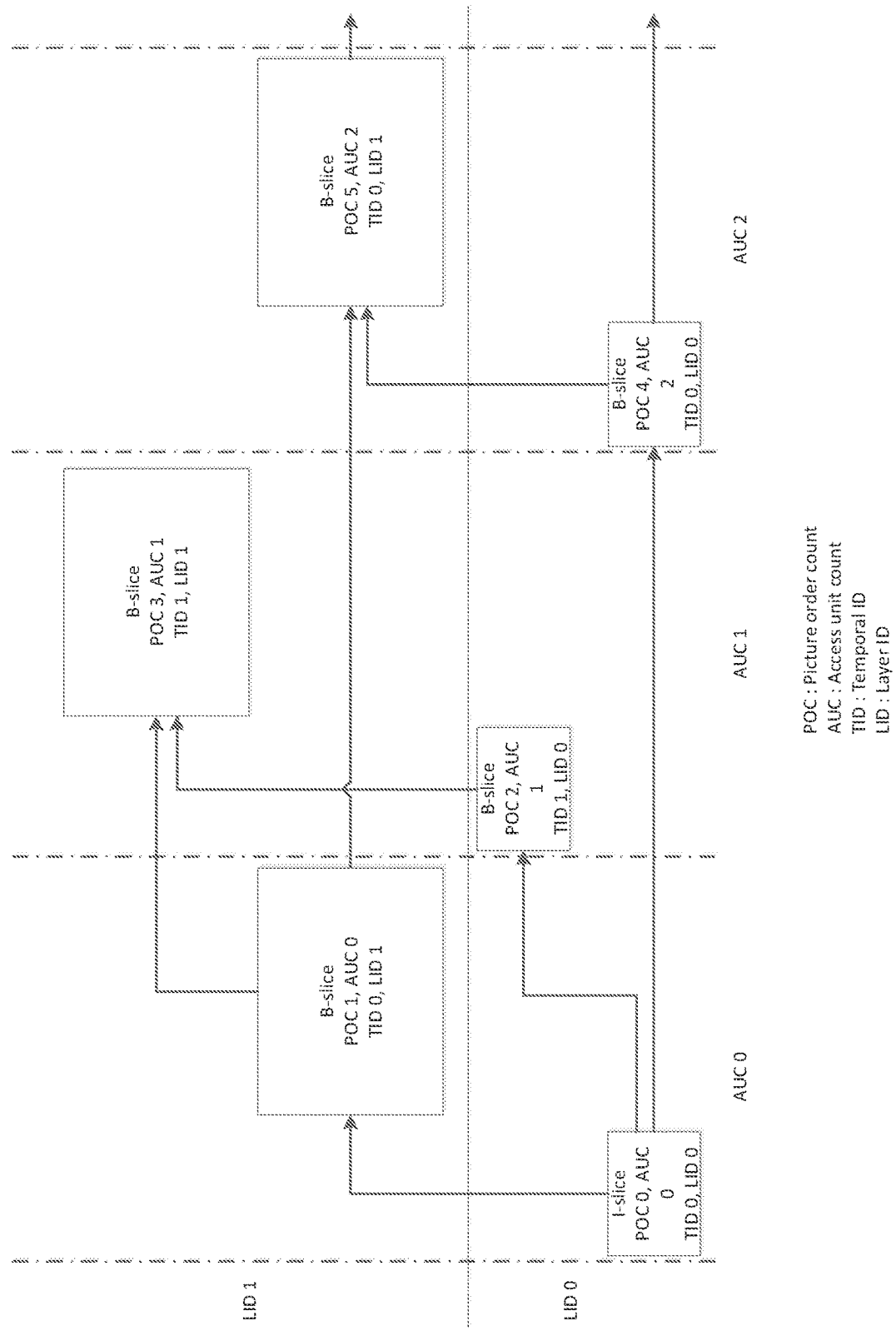

Fig. 9

| | Descriptor |
|---|---|
| video_parameter_set_rbsp() { | |
|   vps_video_parameter_set_id | u(4) |
|   vps_max_layers_minus1 | u(8) |
|   for (i=0; i<= vps_max_layers_minus1; i++) { | |
|     vps_included_layer_id[i] | u(7) |
|     vps_reserved_zero_bit | u(1) |
|   } | |
|   vps_constraint_info_present_flag | u(1) |
|   vps_constant_poc_cycle_per_au | u(1) |
|   if (vps_constant_poc_per_au) | |
|     vps_poc_cycle_au | u(8) |
|   ... | |
| } | |

| | Descriptor |
|---|---|
| slice_header() { | |
|   slice_pic_parameter_set_id | ue(v) |
|   if( rect_slice_flag \|\| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   slice_type | ue(v) |
|   if( NalUnitType == GRA_NUT ) | |
|     recovery_poc_cnt | se(v) |
|   slice_pic_order_cnt_lsb | u(v) |
|   ... | |
|   if( !vps_constant_poc_cycle_per_au) | |
|     slice_poc_cycle_au | u(8) |
| | |
| } | |

Fig. 17

|  | Descriptor |
|---|---|
| video_parameter_set_rbsp() { |  |
|    vps_video_parameter_set_id | u(4) |
|    vps_max_layers_minus1 | u(8) |
|    for (i=0; i<= vps_max_layers_minus1; i++) { |  |
|       vps_included_layer_id[i] | u(7) |
|       vps_reserved_zero_bit | u(1) |
|    } |  |
|    ... |  |
|    vps_sub_picture_dividing_flag | u(1) |
|    if(vps_sub_picture_dividing_flag) { |  |
|       vps_full_pic_width_in_luma_samples | ue(v) |
|       vps_full_pic_height_in_luma_samples | ue(v) |
|    } |  |
|    ... |  |
| } |  |

|  | Descriptor |
|---|---|
| seq_parameter_set_rbsp() { |  |
|    sps_decoding_parameter_set_id | u(4) |
|    sps_video_parameter_set_id | u(4) |
|    sps_max_sub_layers_minus1 | u(3) |
|    ... |  |
|    pic_width_in_luma_samples | ue(v) |
|    pic_height_in_luma_samples | ue(v) |
|    if(vps_sub_picture_dividing_flag) { |  |
|       pic_offset_x | ue(v) |
|       pic_offset_y | ue(v) |
|    } |  |
|    ... |  |
| } |  |

Fig. 18

| | Descriptor |
|---|---|
| sub_region_partitioning_info( payloadSize) { | |
|   num_sub_region | ue(v) |
|   num_layers | ue(v) |
|   for (i=0; i <= num_layers; i++) | |
|     layer_id[i] | ue(v) |
|   for (i=0; i <= num_layers; i++) | |
|     for (j=0; j < i; j++) | |
|       direct_dependency_flag[i][j] | u(1) |
|   for (i=0; i <= num_sub_region; i++) { | |
|     num_layers_for_region[i] | ue(v) |
|     for (j=0; j <= num_layers_for_region [i]; j++) | |
|       sub_region_layer_id[i][j] | ue(v) |
|     sub_region_offset_x[i] | ue(v) |
|     sub_region_offset_y[i] | ue(v) |
|     sub_region_width[i] | ue(v) |
|     sub_region_height[i] | ue(v) |
|   } | |
|   ... | |
| } | |

Fig. 19

| video_parameter_set_rbsp() { | Descriptor |
|---|---|
| ... | |
| vps_max_layers_minus1 | u(6) |
| num_output_layer_sets | ue(v) |
| num_profile_tier_level | ue(v) |
| for( i = 0; i < num_profile_tier_level; i++ ) | |
|   profile_tier_level( vps_max_sub_layers_minus1 ) | |
| for( i = 0; i < num_output_layer_sets; i++ ) { | |
|   output_layer_flag[ i ][ j ] | u(1) |
|   profile_tier_level_idx[ i ][ j ] | u(v) |
| } | |
| ... | |
| } | |

Fig. 20

| video_parameter_set_rbsp() { | Descriptor |
|---|---|
| ... | |
| vps_max_layers_minus1 | u(6) |
| if(vps_max_layers_minus1 > 0) { | |
| num_output_layer_sets | ue(v) |
| num_profile_tier_level | ue(v) |
| } | |
| for( i = 0; i < num_profile_tier_level; i++ ) | |
| profile_tier_level( vps_max_sub_layers_minus1 ) | |
| for( i = 0; i < num_output_layer_sets; i++ ) { | |
| vps_output_layers_mode[ i ] | u(2) |
| vps_ptl_signal_flag[ i ] | u(1) |
| for( j = 0; j < NumLayersInIdList[ i ]; j++ ) { | |
| if(vps_output_layers_mode[i] == 2) | |
| output_layer_flag[ i ][ j ] | u(1) |
| if( vps_ptl_signal_flag[i] ) | |
| profile_tier_level_idx[ i ][ j ] | u(v) |
| } | |
| ... | |
| } | |

Fig. 21

| | Descriptor |
|---|---|
| video_parameter_set_rbsp() { | |
|   vps_max_layers_minus1 | u(6) |
|   if(vps_max_layers_minus1 > 0) { | |
|     num_output_layer_sets | ue(v) |
|     num_profile_tier_level | ue(v) |
|   } | |
|   max_subpics_minus1 | u(8) |
|   for( i = 0; i < max_subpics_minus1 ; i++ ) { | |
|     sub_pic_id[i] | u(8) |
|   } | |
|   for( i = 0; i < num_profile_tier_level; i++ ) | |
|     profile_tier_level( vps_max_sub_layers_minus1 ) | |
|   for( i = 0; i < num_output_layer_sets; i++) { | |
|     vps_output_layers_mode[ i ] | u(2) |
|     vps_ptl_signal_flag[ i ] | u(1) |
|     for( j = 0; i < NumLayersInIdList[ i ]; i++) { | |
|       num_output_subpic_layer[i][j] | ue(v) |
|       for( k = 0; k < num_output_subpic_layer[i][j]; k++ ) | |
|         sub_pic_id_layer[i][j][k] | u(8) |
|       if(vps_output_layers_mode[i] == 2 ) | |
|         output_layer_flag[ i ][ j ] | u(1) |
|       if( vps_ptl_signal_flag[i] ) | |
|         profile_tier_level_idx[ i ][ j ] | u(v) |
|     } | |
|   } | |
|   ... | |
| } | |

Fig. 22

| | Descriptor |
|---|---|
| pic_parameter_set_rbsp( ) { | |
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| if( pps_conformance_window_flag ) { | |
| pps_conf_win_left_offset | ue(v) |
| pps_conf_win_right_offset | ue(v) |
| pps_conf_win_top_offset | ue(v) |
| pps_conf_win_bottom_offset | ue(v) |
| } | |
| scaling_window_explicit_signalling_flag | u(1) |
| if( scaling_window_explicit_signalling_flag ) { | |
| scaling_win_left_offset | ue(v) |
| scaling_win_right_offset | ue(v) |
| scaling_win_top_offset | ue(v) |
| scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
| pps_num_subpics_minus1 | ue(v) |
| pps_subpic_id_len_minus1 | ue(v) |
| for( i = 0; i <= pps_num_subpic_minus1; i++ ) | |
| pps_subpic_id[ i ] | u(v) |
| } | |
| ... | |
| } | |

Fig. 23

| | Descriptor |
|---|---|
| seq_parameter_set_rbsp( ) { | |
| ... | |
| subpic_info_present_flag | u(1) |
| if( subpic_info_present_flag ) { | |
| sps_num_subpics_minus2 | ue(v) |
| sps_independent_subpics_flag | u(1) |
| for( i = 0; i <= sps_num_subpics_minus2 + 1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus2 + 1 && | |
| pic_width_max_in_luma_samples > CtbSizeY ) | |
| subpic_width_minus1[ i ] | u(v) |
| if( i < sps_num_subpics_minus2 + 1 && | |
| pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus2 + 1; i++ ) | |
| sps_subpic_id[ i ] | u(v) |
| } | |
| } | |
| ... | |
| } | |

| | Descriptor |
|---|---|
| pic_parameter_set_rbsp( ) { | |
| ... | |
| mixed_nalu_types_in_pic_flag | u(1) |
| ... | |
| subpic_id_mapping_in_pps_flag | u(1) |
| if( subpic_id_mapping_in_pps_flag ) { | |
| pps_num_subpics_minus1 | ue(v) |
| pps_subpic_id_len_minus1 | ue(v) |
| for( i = 0; i <= pps_num_subpic_minus1; i++ ) | |
| pps_subpic_id[ i ] | u(v) |
| } | |
| pps_independent_subpics_flag | u(1) |
| if( !pps_independent_subpics_flag ) { | |
| if( !subpic_id_mapping_in_pps_flag ) | |
| pps_num_subpics_minus1 | ue(v) |
| for( i = 0; i <= pps_num_subpic_minus1; i++ ) { | |
| subpic_treated_as_pic_flag[ i ] | u(1) |
| loop_filter_across_subpic_enabled_flag[ i ] | u(1) |
| } | |
| ... | |

Fig. 24

METHOD FOR SIGNALING MIXED NAL UNIT TYPE AND SUBPICTURE PARTITIONING IN CODED VIDEO STREAM

CROSS-REFERENCE TO RELATED APPLICATION

This application claims priority from U.S. Provisional Patent Application No. 63/003,137, filed on Mar. 31, 2020, in the U.S. Patent and Trademark Office, which is incorporated herein by reference in its entirety.

FIELD

This disclosure relates generally to field of data processing, and more particularly to video encoding and decoding.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Historically, video encoders and decoders tended to operate on a given picture size that was, in most cases, defined and stayed constant for a coded video sequence (CVS), Group of Pictures (GOP), or a similar multi-picture timeframe. For example, in MPEG-2, system designs are known to change the horizontal resolution (and, thereby, the picture size) dependent on factors such as activity of the scene, but only at I pictures, hence typically for a GOP. The resampling of reference pictures for use of different resolutions within a CVS is known, for example, from ITU-T Rec. H.263 Annex P. However, here the picture size does not change, only the reference pictures are being resampled, resulting potentially in only parts of the picture canvas being used (in case of downsampling), or only parts of the scene being captured (in case of upsampling). Further, H.263 Annex Q allows the resampling of an individual macroblock by a factor of two (in each dimension), upward or downward. Again, the picture size remains the same. The size of a macroblock is fixed in H.263, and therefore does not need to be signaled.

Changes of picture size in predicted pictures became more mainstream in modern video coding. For example, VP9 allows reference picture resampling and change of resolution for a whole picture. Similarly, certain proposals made towards VVC (including, for example, Hendry, et. al, "On adaptive resolution change (ARC) for VVC", Joint Video Team document JVET-M0135-v1, Jan. 9-19, 2019, incorporated herein in its entirety) allow for resampling of whole reference pictures to different—higher or lower—resolutions. In that document, different candidate resolutions are suggested to be coded in the sequence parameter set and referred to by per-picture syntax elements in the picture parameter set.

SUMMARY

Embodiments relate to a method, system, and computer readable medium for coding video data. According to one aspect, a method for coding video data is provided. The method may include receiving video data including one or more subpictures. A network abstraction layer (NAL) unit type associated with each of the one or more subpictures is identified based on checking a flag corresponding to mixed NAL units in the one or more subpictures. The video data is decoded based on the identified NAL unit types.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data including one or more subpictures. A network abstraction layer (NAL) unit type associated with each of the one or more subpictures is identified based on checking a flag corresponding to mixed NAL units in the one or more subpictures. The video data is decoded based on the identified NAL unit types.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data including one or more subpictures. A network abstraction layer (NAL) unit type associated with each of the one or more subpictures is identified based on checking a flag corresponding to mixed NAL units in the one or more subpictures. The video data is decoded based on the identified NAL unit types.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 6 is an example of a syntax table in accordance with an embodiment.

FIG. 7 is a schematic illustration of a computer system in accordance with an embodiment.

FIG. 8 is an example of prediction structure for scalability with adaptive resolution change.

FIG. 9 is an example of a syntax table in accordance with an embodiment.

FIG. 17 is an example of a syntax table for sub-picture layout information

FIG. 18 is an example of a syntax table of SEI message for sub-picture layout information.

FIG. 19 is an example of a syntax table to indicate output layers and profile/tier/level information for each output layer set.

FIG. 20 is an example of a syntax table to indicate output layer mode on for each output layer set.

FIG. 21 is an example of a syntax table to indicate the present subpicture of each layer for each output layer set.

FIG. 22 is an example of a syntax table to indicate the subpicture identifier.

FIG. 23 is an example of a syntax table to indicate the subpicture partitioning information.

FIG. 24 is an example of a syntax table to indicate the mixed NAL unit type and the associated subpicture partitioning information.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

As previously described, video encoders and decoders tended to operate on a given picture size that was, in most cases, defined and stayed constant for a coded video sequence. However, a picture can be partitioned into one or more subpictures. Each subpicture can be further partitioned into one or more slices. Two or more independently coded sub-pictures may be merged into a coded picture, decoded by a decoder, and displayed as a single output picture. It may be advantageous, therefore, to specify some encoding or decoding constraints when two or more independently coded pictures are merged into a coded picture.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
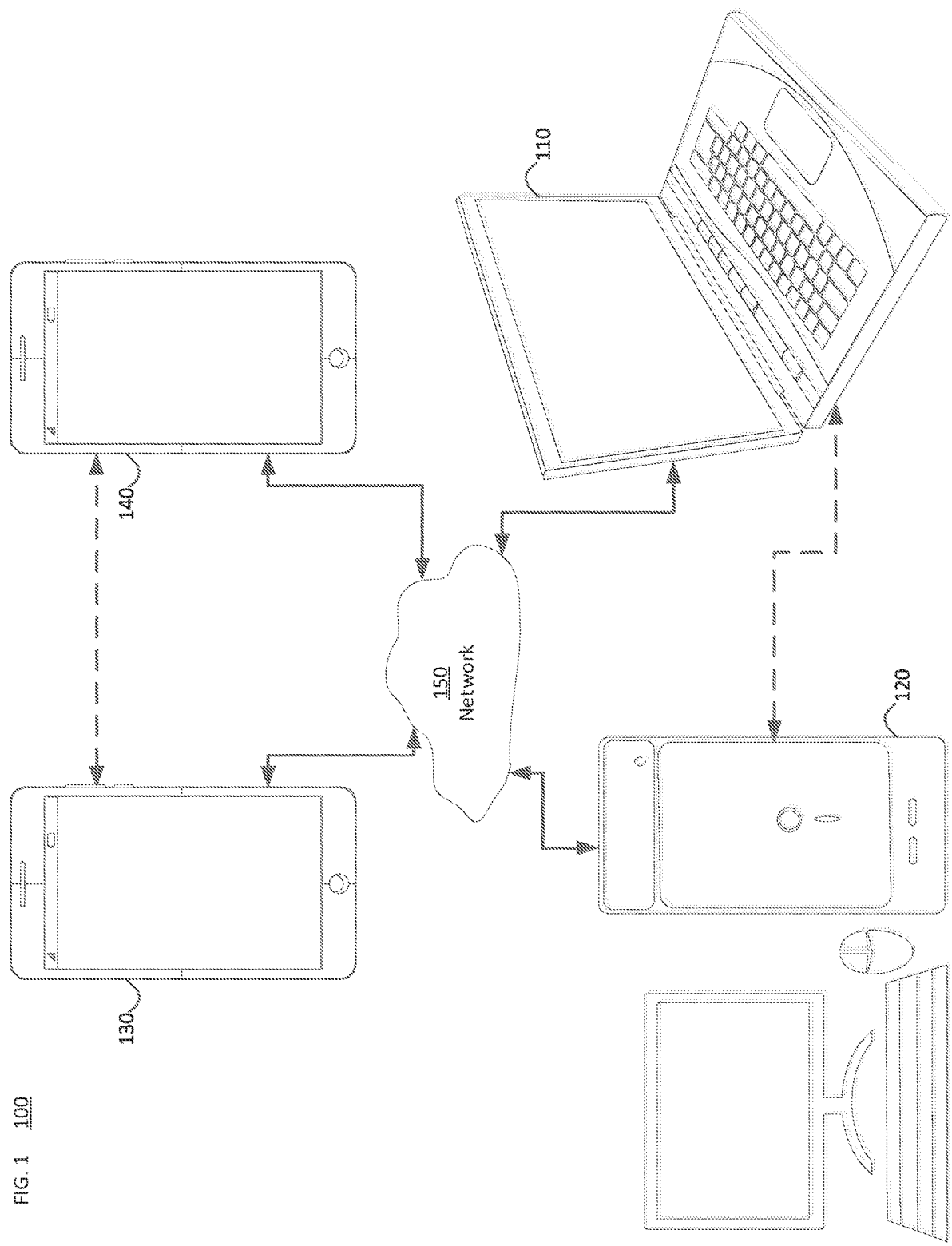
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
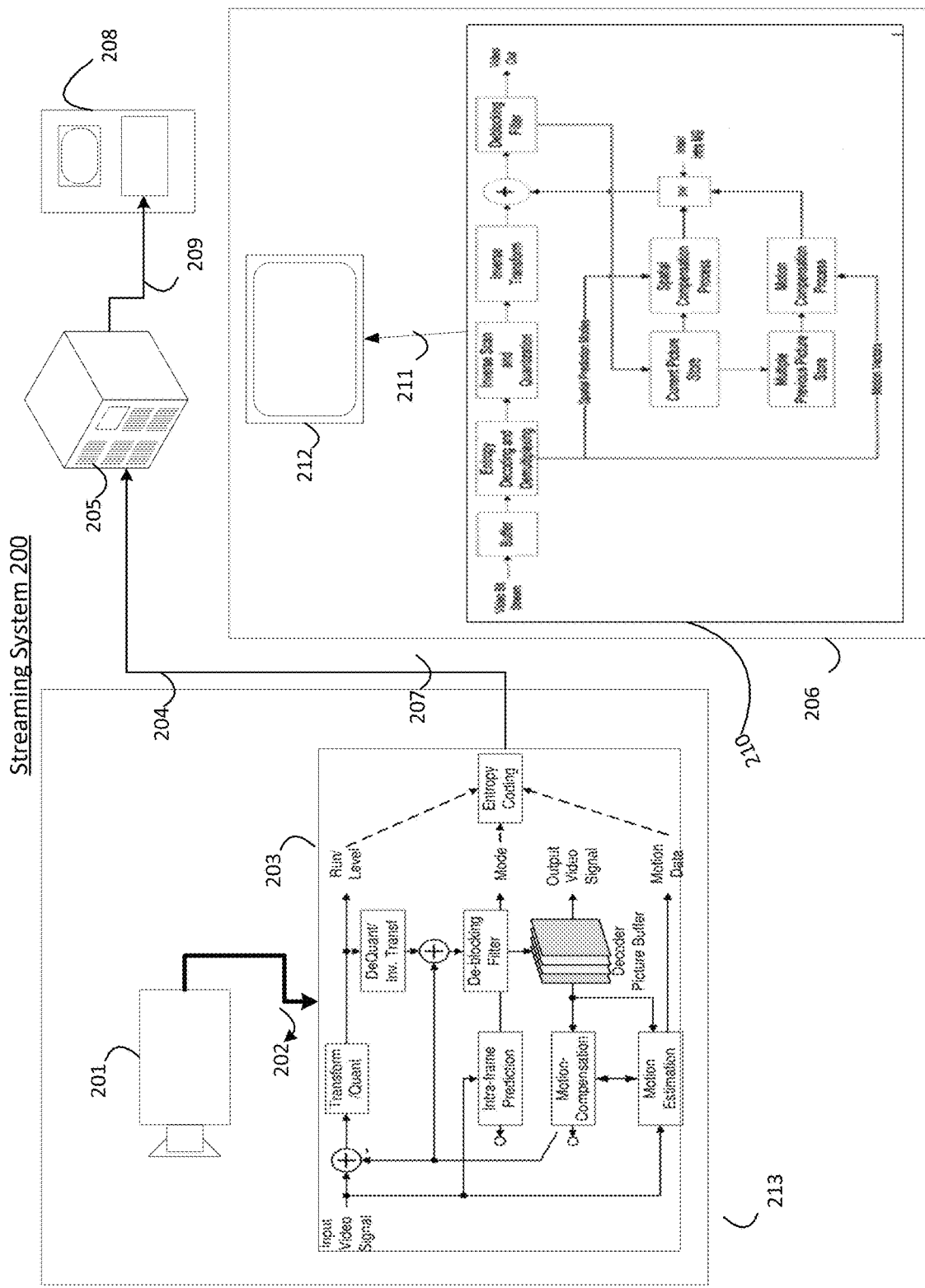
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
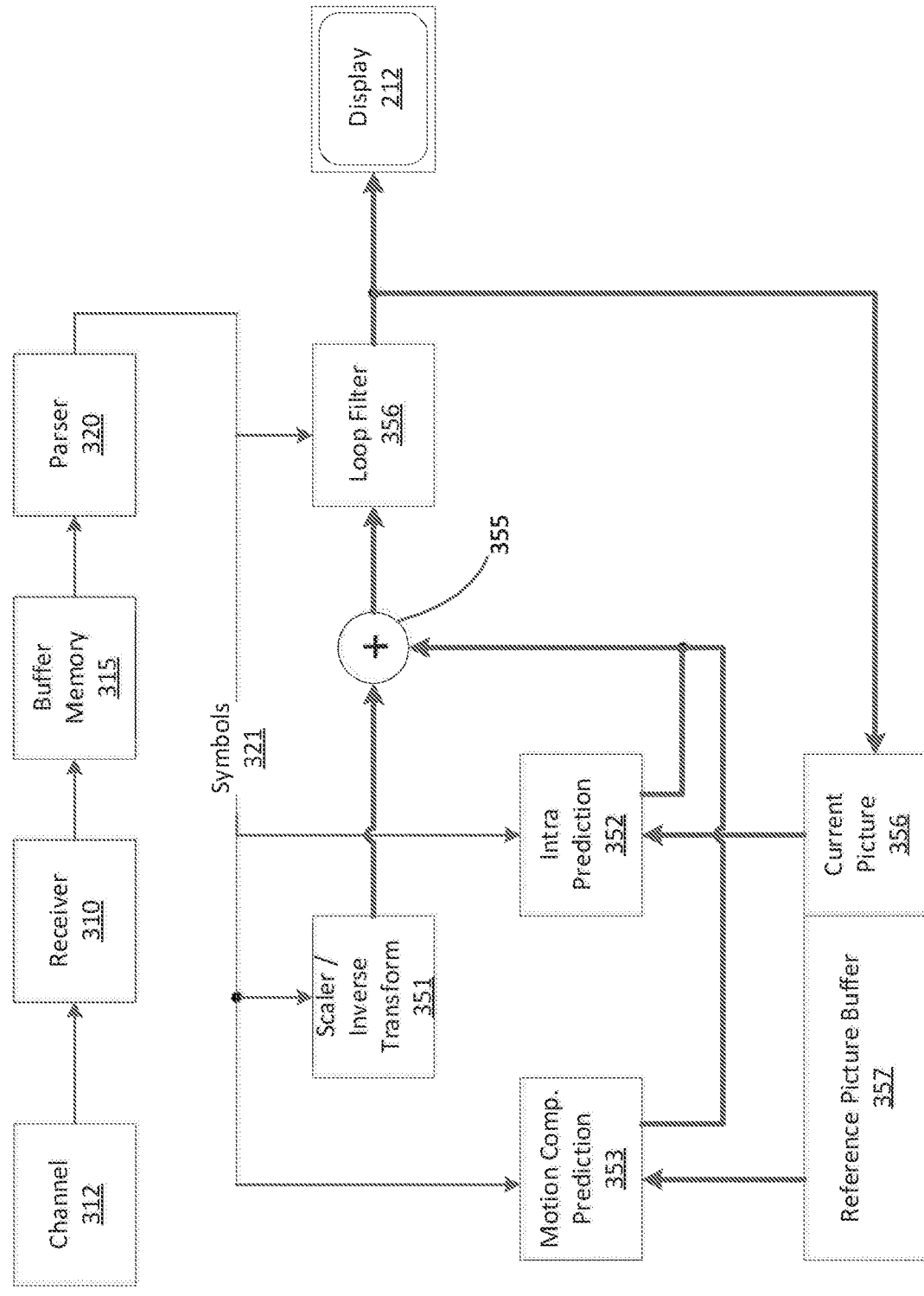
FIG. 3 is a schematic illustration of a simplified block diagram of a decoder in accordance with an embodiment.

FIG. 3 may be a functional block diagram of a video decoder (210) according to an embodiment.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include an parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (320) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
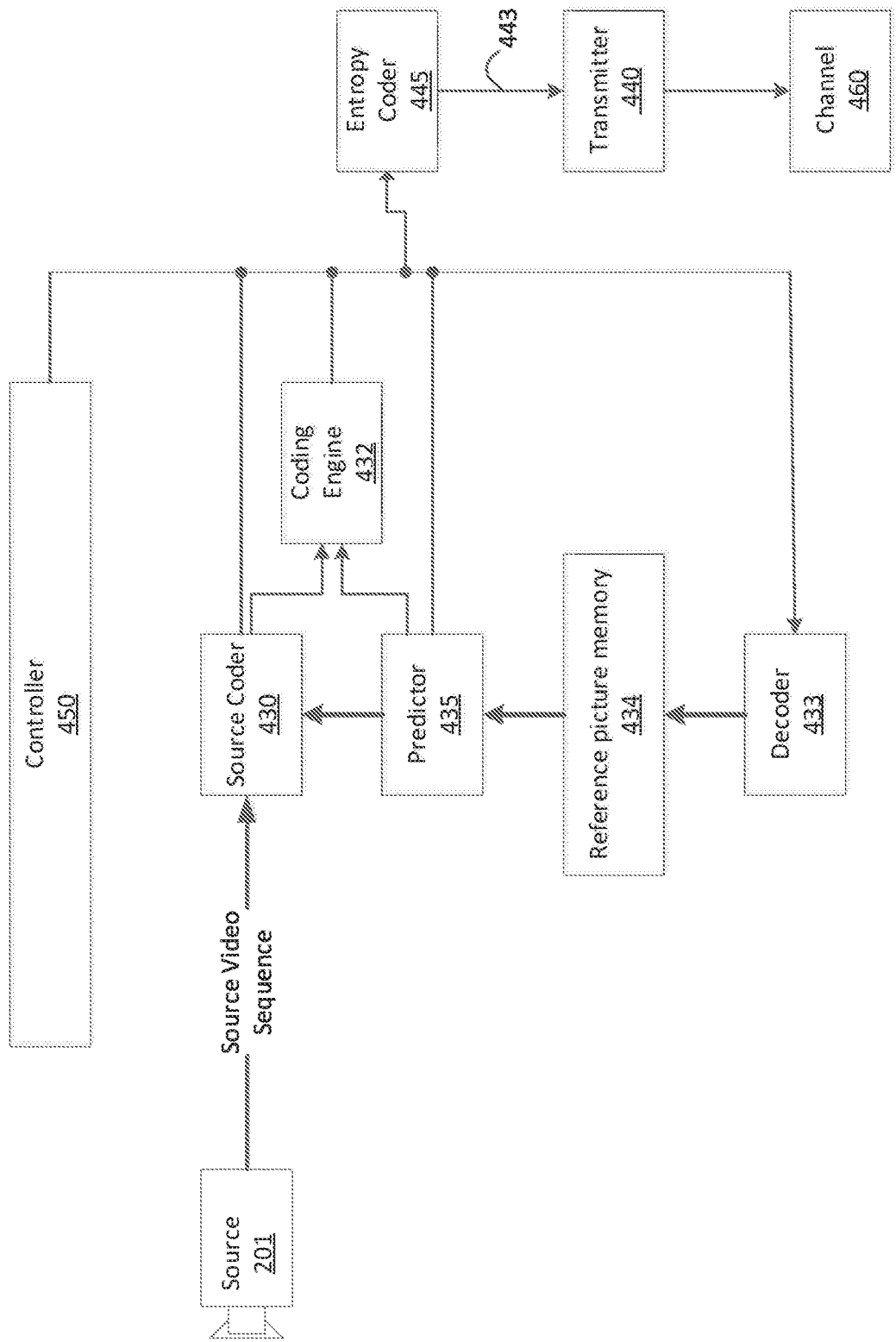
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3.

Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Before describing certain aspects of the disclosed subject matter in more detail, a few terms need to be introduced that will be referred to in the remainder of this description.

Sub-Picture henceforth refers to an, in some cases, rectangular arrangement of samples, blocks, macroblocks, coding units, or similar entities that are semantically grouped, and that may be independently coded in changed resolution. One or more sub-pictures may for a picture. One or more coded sub-pictures may form a coded picture. One or more sub-pictures may be assembled into a picture, and one or more sub pictures may be extracted from a picture. In certain environments, one or more coded sub-pictures may be assembled in the compressed domain without transcoding to the sample level into a coded picture, and in the same or certain other cases, one or more coded sub-pictures may be extracted from a coded picture in the compressed domain.

Adaptive Resolution Change (ARC) henceforth refers to mechanisms that allow the change of resolution of a picture or sub-picture within a coded video sequence, by the means of, for example, reference picture resampling. ARC parameters henceforth refer to the control information required to perform adaptive resolution change, that may include, for example, filter parameters, scaling factors, resolutions of output and/or reference pictures, various control flags, and so forth.

Above description is focused on coding and decoding a single, semantically independent coded video picture. Before describing the implication of coding/decoding of multiple sub pictures with independent ARC parameters and its implied additional complexity, options for signaling ARC parameters shall be described.

Figure 5:
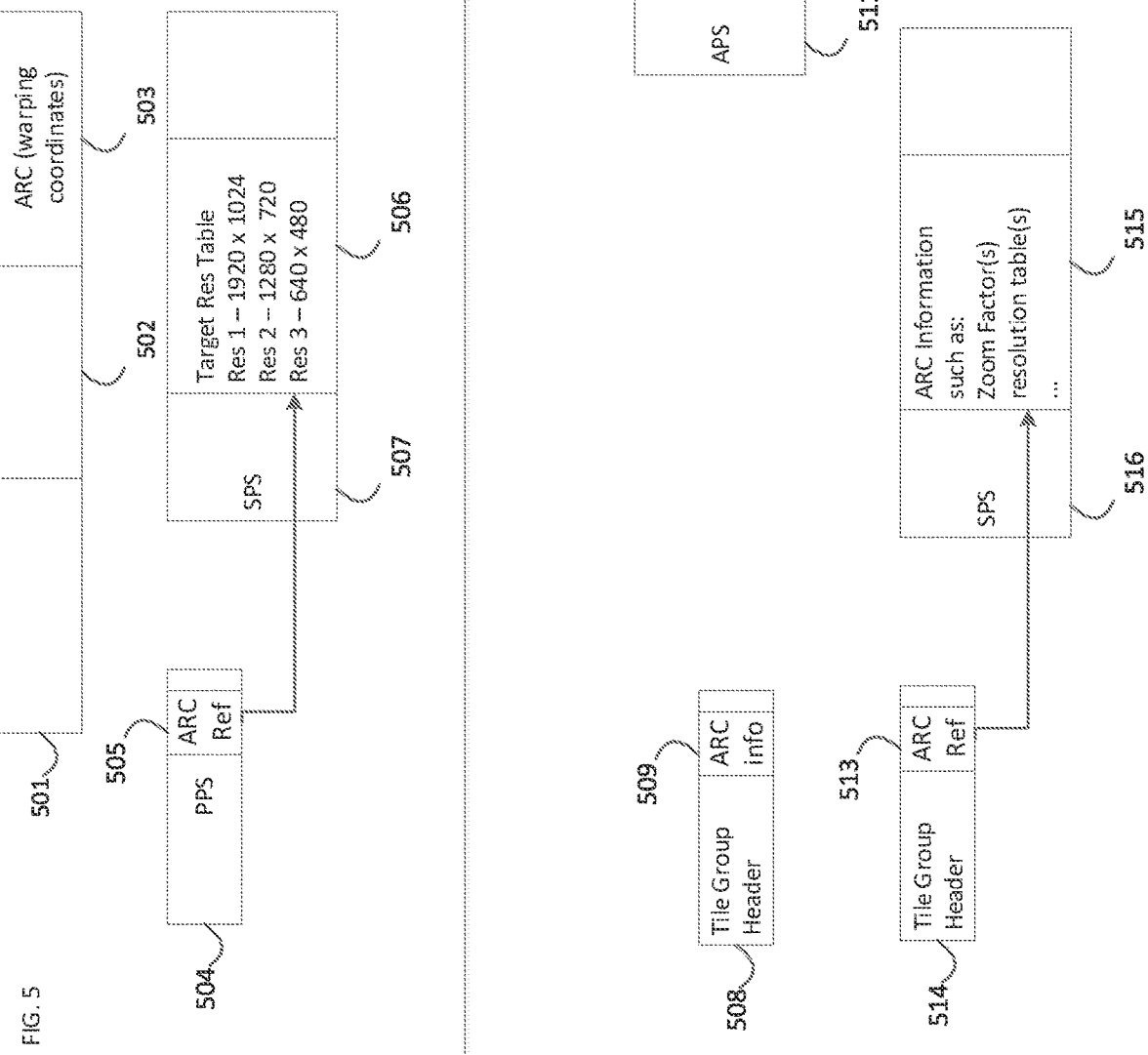
FIG. 5 is a schematic illustration of options for signaling ARC parameters in accordance with prior art or an embodiment, as indicated.

Referring to FIG. 5, shown are several novel options for signaling ARC parameters. As noted with each of the options, they have certain advantages and certain disadvantages from a coding efficiency, complexity, and architecture viewpoint. A video coding standard or technology may choose one or more of these options, or options known from previous art, for signaling ARC parameters. The options may not be mutually exclusive, and conceivably may be interchanged based on application needs, standards technology involved, or encoder's choice.

Classes of ARC parameters may include:

up/downsample factors, separate or combined in X and Y dimension up/downsample factors, with an addition of a temporal dimension, indicating constant speed zoom in/out for a given number of pictures Either of the above two may involve the coding of one or more presumably short syntax elements that may point into a table containing the factor(s).

resolution, in X or Y dimension, in units of samples, blocks, macroblocks, CUs, or any other suitable granularity, of the input picture, output picture, reference picture, coded picture, combined or separately. If there are more than one resolution (such as, for example, one for input picture, one for reference picture) then, in certain cases, one set of values may be inferred to from another set of values. Such could be gated, for example, by the use of flags. For a more detailed example, see below.

"warping" coordinates akin those used in H.263 Annex P, again in a suitable granularity as described above. H.263 Annex P defines one efficient way to code such warping coordinates, but other, potentially more efficient ways could conceivably also be devised. For example, the variable length reversible, "Huffman"-style coding of warping coordinates of Annex P could be replaced by a suitable length binary coding, where the length of the binary code word could, for example, be derived from a maximum picture size, possibly multiplied by a certain factor and offset by a certain value, so to allow for "warping" outside of the maximum picture size's boundaries.

up or downsample filter parameters. In the easiest case, there may be only a single filter for up and/or downsampling. However, in certain cases, it can be advantageous to allow more flexibility in filter design, and that may require to signaling of filter parameters. Such parameters may be selected through an index in a list of possible filter designs, the filter may be fully specified (for example through a list of filter coefficients, using suitable entropy coding techniques), the filter may be implicitly selected through up/downsample ratios according which in turn are signaled according to any of the mechanisms mentioned above, and so forth.

Henceforth, the description assumes the coding of a finite set of up/downsample factors (the same factor to be used in both X and Y dimension), indicated through a codeword. That codeword can advantageously be variable length coded, for example using the Ext-Golomb code common for certain syntax elements in video coding specifications such as H.264 and H.265. One suitable mapping of values to up/downsample factors can, for example, be according to the following table

| Codeword | Ext-Golomb Code | Original/Target resolution |
|---|---|---|
| 0 | 1 | 1/1 |
| 1 | 010 | 1/1.5 (upscale by 50%) |
| 2 | 011 | 1.5/1 (downscale by 50%) |
| 3 | 00100 | 1/2 (upscale by 100%) |
| 4 | 00101 | 2/1 (downscale by 100%) |

Many similar mappings could be devised according to the needs of an application and the capabilities of the up and downscale mechanisms available in a video compression technology or standard. The table could be extended to more values. Values may also be represented by entropy coding mechanisms other than Ext-Golomb codes, for example using binary coding. That may have certain advantages when the resampling factors were of interest outside the video processing engines (encoder and decoder foremost) themselves, for example by MANES. It should be noted that, for the (presumably) most common case where no resolution change is required, an Ext-Golomb code can be chosen that is short; in the table above, only a single bit. That can have a coding efficiency advantage over using binary codes for the most common case.

The number of entries in the table, as well as their semantics may be fully or partially configurable. For example, the basic outline of the table may be conveyed in a "high" parameter set such as a sequence or decoder parameter set. Alternatively or in addition, one or more such tables may be defined in a video coding technology or standard, and may be selected through for example a decoder or sequence parameter set.

Henceforth, we describe how an upsample/downsample factor (ARC information), coded as described above, may be included in a video coding technology or standard syntax. Similar considerations may apply to one, or a few, codewords controlling up/downsample filters. See below for a discussion when comparatively large amounts of data are required for a filter or other data structures.

H.263 Annex P includes the ARC information 502 in the form of four warping coordinates into the picture header 501, specifically in the H.263 PLUSPTYPE (503) header extension. This can be a sensible design choice when a) there is a picture header available, and b) frequent changes of the ARC information are expected. However, the overhead when using H.263-style signaling can be quite high, and scaling factors may not pertain among picture boundaries as picture header can be of transient nature.

JVCET-M135-v1, cited above, includes the ARC reference information (505) (an index) located in a picture parameter set (504), indexing a table (506) including target resolutions that in turn is located inside a sequence parameter set (507). The placement of the possible resolution in a table (506) in the sequence parameter set (507) can, according to verbal statements made by the authors, be justified by using the SPS as an interoperability negotiation point during capability exchange. Resolution can change, within the limits set by the values in the table (506) from picture to picture by referencing the appropriate picture parameter set (504).

Still referring to FIG. 5, the following additional options may exist to convey ARC information in a video bitstream. Each of those options has certain advantages over existing art as described above. The options may be simultaneously present in the same video coding technology or standard.

In an embodiment, ARC information (509) such as a resampling (zoom) factor may be present in a slice header, GOB header, tile header, or tile group header (tile group header henceforth) (508). This can be adequate of the ARC information is small, such as a single variable length ue(v) or fixed length codeword of a few bits, for example as shown above. Having the ARC information in a tile group header directly has the additional advantage of the ARC information may be applicable to a sub picture represented by, for example, that tile group, rather than the whole picture. See also below. In addition, even if the video compression technology or standard envisions only whole picture adaptive resolution changes (in contrast to, for example, tile group based adaptive resolution changes), putting the ARC information into the tile group header vis a vis putting it into an H.263-style picture header has certain advantages from an error resilience viewpoint.

In the same or another embodiment, the ARC information (512) itself may be present in an appropriate parameter set (511) such as, for example, a picture parameter set, header parameter set, tile parameter set, adapation parameter set, and so forth (Adapation parameter set depicted). The scope of that parameter set can advantageously be no larger than a picture, for example a tile group. The use of the ARC information is implicit through the activation of the relevant parameter set. For example, when a video coding technology or standard contemplates only picture-based ARC, then a picture parameter set or equivalent may be appropriate.

in the same or another embodiment, ARC reference information (513) may be present in a Tile Group header (514) or a similar data structure. That reference information (513) can refer to a subset of ARC information (515) available in a parameter set (516) with a scope beyond a single picture, for example a sequence parameter set, or decoder parameter set.

The additional level of indirection implied activation of a PPS from a tile group header, PPS, SPS, as used in JVET-M0135-v1 appears to be unnecessary, as picture parameter sets, just as sequence parameter sets, can (and have in certain standards such as RFC3984) be used for capability negotiation or announcements. If, however, the ARC information should be applicable to a sub picture represented, for example, by a tile groups also, a parameter set with an activation scope limited to a tile group, such as the Adaptation Parameter set or a Header Parameter Set may be the better choice. Also, if the ARC information is of more than negligible size—for example contains filter control information such as numerous filter coefficients—then a parameter may be a better choice than using a header (508) directly from a coding efficiency viewpoint, as those settings may be reusable by future pictures or sub-pictures by referencing the same parameter set.

When using the sequence parameter set or another higher parameter set with a scope spanning multiple pictures, certain considerations may apply:

1. The parameter set to store the ARC information table (516) can, in some cases, be the sequence parameter set, but in other cases advantageously the decoder parameter set. The decoder parameter set can have an activation scope of multiple CVSs, namely the coded video stream, i.e. all coded video bits from session start until session teardown. Such a scope may be more appropriate because possible ARC factors may be a decoder feature, possibly implemented in hardware, and hardware features tend not to change with any CVS (which in at least some entertainment systems is a Group of Pictures, one second or less in length). That said, putting the table into the sequence parameter set is expressly included in the placement options described herein, in particular in conjunction with point 2 below.

2. The ARC reference information (513) may advantageously be placed directly into the picture/slice tile/GOB/tile group header (tile group header henceforth) (514) rather than into the picture parameter set as in JVCET-M0135-v1, The reason is as follows: when an encoder wants to change a single value in a picture parameter set, such as for example the ARC reference information, then it has to create a new PPS and reference that new PPS. Assume that only the ARC reference information changes, but other information such as, for example, the quantization matrix information in the PPS stays. Such information can be of substantial size, and would need to be retransmitted to make the new PPS complete. As the ARC reference information may be a single codeword, such as the index into the table (513) and that would be the only value that changes, it would be cumbersome and wasteful to retransmit all the, for example, quantization matrix information. Insofar, can be considerably better from a coding efficiency viewpoint to avoid the indirection through the PPS, as proposed in JVET-M0135-v1. Similarly, putting the ARC reference information into the PPS has the additional disadvantage that the ARC information referenced by the ARC reference information (513) necessarily needs to apply to the whole picture and not to a sub-picture, as the scope of a picture parameter set activation is a picture.

In the same or another embodiment, the signaling of ARC parameters can follow a detailed example as outlined in FIG. 6. FIG. 6 depicts syntax diagrams in a representation as used in video coding standards since at least 1993. The notation of such syntax diagrams roughly follows C-style programming. Lines in boldface indicate syntax elements present in the bitstream, lines without boldface often indicate control flow or the setting of variables.

A tile group header (601) as an exemplary syntax structure of a header applicable to a (possibly rectangular) part of a picture can conditionally contain, a variable length, Exp-Golomb coded syntax element dec_pic_size_idx (602) (depicted in boldface). The presence of this syntax element in the tile group header can be gated on the use of adaptive resolution (603)—here, the value of a flag not depicted in boldface, which means that flag is present in the bitstream at the point where it occurs in the syntax diagram. Whether or not adaptive resolution is in use for this picture or parts thereof can be signaled in any high level syntax structure inside or outside the bitstream. In the example shown, it is signaled in the sequence parameter set as outlined below.

Still referring to FIG. 6, shown is also an excerpt of a sequence parameter set (610). The first syntax element shown is adaptiv_epic_resolution_change_flag (611). When true, that flag can indicate the use of adaptive resolution which, in turn may require certain control information. In the example, such control information is conditionally present based on the value of the flag based on the if( ) statement in the parameter set (612) and the tile group header (601).

When adaptive resolution is in use, in this example, coded is an output resolution in units of samples (613). The numeral 613 refers to both output_pic_width_in_luma_samples and output_pic_height_in_luma_samples, which together can define the resolution of the output picture. Elsewhere in a video coding technology or standard, certain restrictions to either value can be defined. For example, a level definition may limit the number of total output samples, which could be the product of the value of those two syntax elements. Also, certain video coding technologies or standards, or external technologies or standards such as, for example, system standards, may limit the numbering range (for example, one or both dimensions must be divisible by a power of 2 number), or the aspect ratio (for example, the width and height must be in a relation such as 4:3 or 16:9). Such restrictions may be introduced to facilitate hardware implementations or for other reasons, and are well known in the art.

In certain applications, it can be advisable that the encoder instructs the decoder to use a certain reference picture size rather than implicitly assume that size to be the output picture size. In this example, the syntax element reference_pic_size_present_flag (614) gates the conditional presence of reference picture dimensions (615) (again, the numeral refers to both width and height).

Finally, shown is a table of possible decoding picture width and heights. Such a table can be expressed, for example, by a table indication (num_dec_pic_size_in_luma_samples_minus1) (616). The "minus1" can refer to the interpretation of the value of that syntax element. For example, if the coded value is zero, one table entry is present. If the value is five, six table entries are present. For each "line" in the table, decoded picture width and height are then included in the syntax (617).

The table entries presented (617) can be indexed using the syntax element dec_pic_size_idx (602) in the tile group header, thereby allowing different decoded sizes—in effect, zoom factors—per tile group.

Certain video coding technologies or standards, for example VP9, support spatial scalability by implementing certain forms of reference picture resampling (signaled quite differently from the disclosed subject matter) in conjunction with temporal scalability, so to enable spatial scalability. In particular, certain reference pictures may be upsampled using ARC-style technologies to a higher resolution to form the base of a spatial enhancement layer. Those upsampled pictures could be refined, using normal prediction mechanisms at the high resolution, so to add detail.

The disclosed subject matter can be used in such an environment. In certain cases, in the same or another embodiment, a value in the NAL unit header, for example the Temporal ID field, can be used to indicate not only the temporal but also the spatial layer. Doing so has certain advantages for certain system designs; for example, existing Selected Forwarding Units (SFU) created and optimized for temporal layer selected forwarding based on the NAL unit header Temporal ID value can be used without modification, for scalable environments. In order to enable that, there may be a requirement for a mapping between the coded picture size and the temporal layer is indicated by the temporal ID field in the NAL unit header.

In some video coding technologies, an Access Unit (AU) can refer to coded picture(s), slice(s), tile(s), NAL Unit(s), and so forth, that were captured and composed into a the respective picture/slice/tile/NAL unit bitstream at a given instance in time. That instance in time can be the composition time.

In HEVC, and certain other video coding technologies, a picture order count (POC) value can be used for indicating a selected reference picture among multiple reference picture stored in a decoded picture buffer (DPB). When an access unit (AU) comprises one or more pictures, slices, or tiles, each picture, slice, or tile belonging to the same AU may carry the same POC value, from which it can be derived that they were created from content of the same composition time. In other words, in a scenario where two pictures/slices/tiles carry the same given POC value, that can be indicative of the two picture/slice/tile belonging to the same AU and having the same composition time. Conversely, two pictures/tiles/slices having different POC values can indicate those pictures/slices/tiles belonging to different AUs and having different composition times.

In an embodiment of the disclosed subject matter, aforementioned rigid relationship can be relaxed in that an access unit can comprise pictures, slices, or tiles with different POC values. By allowing different POC values within an AU, it becomes possible to use the POC value to identify potentially independently decodable pictures/slices/tiles with identical presentation time. That, in turn, can enable support of multiple scalable layers without a change of reference picture selection signaling (e.g. reference picture set signaling or reference picture list signaling), as described in more detail below.

It is, however, still desirable to be able to identify the AU a picture/slice/tile belongs to, with respect to other picture/slices/tiles having different POC values, from the POC value alone. This can be achieved, as described below.

In the same or other embodiments, an access unit count (AUC) may be signaled in a high-level syntax structure, such as NAL unit header, slice header, tile group header, SEI message, parameter set or AU delimiter. The value of AUC may be used to identify which NAL units, pictures, slices, or tiles belong to a given AU. The value of AUC may be corresponding to a distinct composition time instance. The AUC value may be equal to a multiple of the POC value. By diving the POC value by an integer value, the AUC value may be calculated. In certain cases, division operations can place a certain burden on decoder implementations. In such cases, small restrictions in the numbering space of the AUC values may allow to substitute the division operation by shift operations. For example, the AUC value may be equal to a Most Significant Bit (MSB) value of the POC value range.

In the same embodiment, a value of POC cycle per AU (poc_cycle_au) may be signaled in a high-level syntax structure, such as NAL unit header, slice header, tile group header, SEI message, parameter set or AU delimiter. The poc_cycle_au may indicate how many different and consecutive POC values can be associated with the same AU. For example, if the value of poc_cycle_au is equal to 4, the pictures, slices or tiles with the POC value equal to 0-3, inclusive, are associated with the AU with AUC value equal to 0, and the pictures, slices or tiles with POC value equal to 4-7, inclusive, are associated with the AU with AUC value equal to 1. Hence, the value of AUC may be inferred by dividing the POC value by the value of poc_cycle_au.

In the same or another embodiment, the value of poc_cycle_au may be derived from information, located for example in the video parameter set (VPS), that identifies the number of spatial or SNR layers in a coded video sequence. Such a possible relationship is briefly described below. While the derivation as described above may save a few bits in the VPS and hence may improves coding efficiency, it can be advantageous to explicitly code poc_cycle_au in an appropriate high level syntax structure hierarchically below the video parameter set, so to be able to minimize poc_cycle_au for a given small part of a bitstream such as a picture. This optimization may save more bits than can be saved through the derivation process above because POC values (and/or values of syntax elements indirectly referring to POC) may be coded in low level syntax structures.

The techniques for signaling adaptive resolution parameters described above, can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

FIG. 8 shows an example of a video sequence structure with combination of temporal_id, layer_id, POC and AUC values with adaptive resolution change. In this example, a picture, slice or tile in the first AU with AUC=0 may have temporal_id=0 and layer_id=0 or 1, while a picture, slice or tile in the second AU with AUC=1 may have temporal_id=1 and layer_id=0 or 1, respectively. The value of POC is increased by 1 per picture regardless of the values of temporal_id and layer_id. In this example, the value of poc_cycle_au can be equal to 2. Preferably, the value of poc_cycle_au may be set equal to the number of (spatial scalability) layers. In this example, hence, the value of POC is increased by 2, while the value of AUC is increased by 1.

In the above embodiments, all or sub-set of inter-picture or inter-layer prediction structure and reference picture indication may be supported by using the existing reference picture set (RPS) signaling in HEVC or the reference picture list (RPL) signaling. In RPS or RPL, the selected reference picture is indicated by signaling the value of POC or the delta value of POC between the current picture and the selected reference picture. For the disclosed subject matter, the RPS and RPL can be used to indicate the inter-picture or inter-layer prediction structure without change of signaling, but with the following restrictions. If the value of temporal_id of a reference picture is greater than the value of temporal_id current picture, the current picture may not use the reference picture for motion compensation or other predictions. If the value of layer_id of a reference picture is greater than the value of layer_id current picture, the current picture may not use the reference picture for motion compensation or other predictions.

In the same and other embodiments, the motion vector scaling based on POC difference for temporal motion vector prediction may be disabled across multiple pictures within an access unit. Hence, although each picture may have a different POC value within an access unit, the motion vector is not scaled and used for temporal motion vector prediction within an access unit. This is because a reference picture with a different POC in the same AU is considered a reference picture having the same time instance. Therefore, in the embodiment, the motion vector scaling function may return 1, when the reference picture belongs to the AU associated with the current picture.

In the same and other embodiments, the motion vector scaling based on POC difference for temporal motion vector prediction may be optionally disabled across multiple pictures, when the spatial resolution of the reference picture is different from the spatial resolution of the current picture. When the motion vector scaling is allowed, the motion vector is scaled based on both POC difference and the spatial resolution ratio between the current picture and the reference picture.

In the same or another embodiment, the motion vector may be scaled based on AUC difference instead of POC difference, for temporal motion vector prediction, especially when the poc_cycle_au has non-uniform value (when vps_contant_poc_cycle_per_au==0). Otherwise (when vps_contant_poc_cycle_per_au==1), the motion vector scaling based on AUC difference may be identical to the motion vector scaling based on POC difference.

In the same or another embodiment, when the motion vector is scaled based on AUC difference, the reference motion vector in the same AU (with the same AUC value) with the current picture is not scaled based on AUC difference and used for motion vector prediction without scaling or with scaling based on spatial resolution ratio between the current picture and the reference picture.

In the same and other embodiments, the AUC value is used for identifying the boundary of AU and used for hypothetical reference decoder (HRD) operation, which needs input and output timing with AU granularity. In most cases, the decoded picture with the highest layer in an AU may be outputted for display. The AUC value and the layer_id value can be used for identifying the output picture.

In an embodiment, a picture may consist of one or more sub-pictures. Each sub-picture may cover a local region or the entire region of the picture. The region supported by a sub-picture may or may not be overlapped with the region supported by another sub-picture. The region composed by one or more sub-pictures may or may not cover the entire region of a picture. If a picture consists of a sub-picture, the region supported by the sub-picture is identical to the region supported by the picture.

In the same embodiment, a sub-picture may be coded by a coding method similar to the coding method used for the coded picture. A sub-picture may be independently coded or may be coded dependent on another sub-picture or a coded picture. A sub-picture may or may not have any parsing dependency from another sub-picture or a coded picture.

In the same embodiment, a coded sub-picture may be contained in one or more layers. A coded sub-picture in a layer may have a different spatial resolution. The original sub-picture may be spatially re-sampled (up-sampled or down-sampled), coded with different spatial resolution parameters, and contained in a bitstream corresponding to a layer.

In the same or another embodiment, a sub-picture with (W, H), where W indicates the width of the sub-picture and H indicates the height of the sub-picture, respectively, may be coded and contained in the coded bitstream corresponding to layer 0, while the up-sampled (or down-sampled) sub-picture from the sub-picture with the original spatial resolution, with ($W*S_{w,k}$, $H*S_{h,k}$), may be coded and contained in the coded bitstream corresponding to layer k, where $S_{w,k}$, $S_{h,k}$ indicate the resampling ratios, horizontally and vertically. If the values of $S_{w,k}$, $S_{h,k}$ are greater than 1, the resampling is equal to the up-sampling. Whereas, if the values of $S_{w,k}$, $S_{h,k}$ are smaller than 1, the resampling is equal to the down-sampling.

In the same or another embodiment, a coded sub-picture in a layer may have a different visual quality from that of the coded sub-picture in another layer in the same sub-picture or different subpicture. For example, sub-picture i in a layer, n, is coded with the quantization parameter, $Q_{i,n}$, while a sub-picture j in a layer, m, is coded with the quantization parameter, $Q_{j,m}$.

In the same or another embodiment, a coded sub-picture in a layer may be independently decodable, without any parsing or decoding dependency from a coded sub-picture in another layer of the same local region. The sub-picture layer, which can be independently decodable without referencing another sub-picture layer of the same local region, is the independent sub-picture layer. A coded sub-picture in the independent sub-picture layer may or may not have a decoding or parsing dependency from a previously coded sub-picture in the same sub-picture layer, but the coded sub-picture may not have any dependency from a coded picture in another sub-picture layer.

In the same or another embodiment, a coded sub-picture in a layer may be dependently decodable, with any parsing or decoding dependency from a coded sub-picture in another layer of the same local region. The sub-picture layer, which can be dependently decodable with referencing another sub-picture layer of the same local region, is the dependent sub-picture layer. A coded sub-picture in the dependent sub-picture may reference a coded sub-picture belonging to the same sub-picture, a previously coded sub-picture in the same sub-picture layer, or both reference sub-pictures.

In the same or another embodiment, a coded sub-picture consists of one or more independent sub-picture layers and one or more dependent sub-picture layers. However, at least one independent sub-picture layer may be present for a coded sub-picture. The independent sub-picture layer may have the value of the layer identifier (layer_id), which may be present in NAL unit header or another high-level syntax structure, equal to 0. The sub-picture layer with the layer_id equal to 0 is the base sub-picture layer.

In the same or another embodiment, a picture may consist of one or more foreground sub-pictures and one background sub-picture. The region supported by a background sub-picture may be equal to the region of the picture. The region supported by a foreground sub-picture may be overlapped with the region supported by a background sub-picture. The background sub-picture may be a base sub-picture layer, while the foreground sub-picture may be a non-base (enhancement) sub-picture layer. One or more non-base sub-picture layer may reference the same base layer for decoding. Each non-base sub-picture layer with layer_id equal to a may reference a non-base sub-picture layer with layer_id equal to b, where a is greater than b.

In the same or another embodiment, a picture may consist of one or more foreground sub-pictures with or without a background sub-picture. Each sub-picture may have its own base sub-picture layer and one or more non-base (enhancement) layers. Each base sub-picture layer may be referenced by one or more non-base sub-picture layers. Each non-base sub-picture layer with layer_id equal to a may reference a non-base sub-picture layer with layer_id equal to b, where a is greater than b.

In the same or another embodiment, a picture may consist of one or more foreground sub-pictures with or without a background sub-picture. Each coded sub-picture in a (base or non-base) sub-picture layer may be referenced by one or more non-base layer sub-pictures belonging to the same sub-picture and one or more non-base layer sub-pictures, which are not belonging to the same sub-picture.

In the same or another embodiment, a picture may consist of one or more foreground sub-pictures with or without a background sub-picture. A sub-picture in a layer a may be further partitioned into multiple sub-pictures in the same layer. One or more coded sub-pictures in a layer b may reference the partitioned sub-picture in a layer a.

In the same or another embodiment, a coded video sequence (CVS) may be a group of the coded pictures. The CVS may consist of one or more coded sub-picture sequences (CSPS), where the CSPS may be a group of coded sub-pictures covering the same local region of the picture. A CSPS may have the same or a different temporal resolution than that of the coded video sequence.

In the same or another embodiment, a CSPS may be coded and contained in one or more layers. A CSPS may consist of one or more CSPS layers. Decoding one or more CSPS layers corresponding to a CSPS may reconstruct a sequence of sub-pictures corresponding to the same local region.

In the same or another embodiment, the number of CSPS layers corresponding to a CSPS may be identical to or different from the number of CSPS layers corresponding to another CSPS.

In the same or another embodiment, a CSPS layer may have a different temporal resolution (e.g. frame rate) from another CSPS layer. The original (uncompressed) sub-picture sequence may be temporally re-sampled (up-sampled or down-sampled), coded with different temporal resolution parameters, and contained in a bitstream corresponding to a layer.

In the same or another embodiment, a sub-picture sequence with the frame rate, F, may be coded and contained in the coded bitstream corresponding to layer 0, while the temporally up-sampled (or down-sampled) sub-picture sequence from the original sub-picture sequence, with $F*S_{t,k}$, may be coded and contained in the coded bitstream corresponding to layer k, where $S_{t,k}$ indicates the temporal sampling ratio for layer k. If the value of $S_{t,k}$ is greater than 1, the temporal resampling process is equal to the frame rate up conversion. Whereas, if the value of $S_{t,k}$ is smaller than 1, the temporal resampling process is equal to the frame rate down conversion.

In the same or another embodiment, when a sub-picture with a CSPS layer a is reference by a sub-picture with a CSPS layer b for motion compensation or any inter-layer prediction, if the spatial resolution of the CSPS layer a is different from the spatial resolution of the CSPS layer b, decoded pixels in the CSPS layer a are resampled and used for reference. The resampling process may need an up-sampling filtering or a down-sampling filtering.

Figure 10:
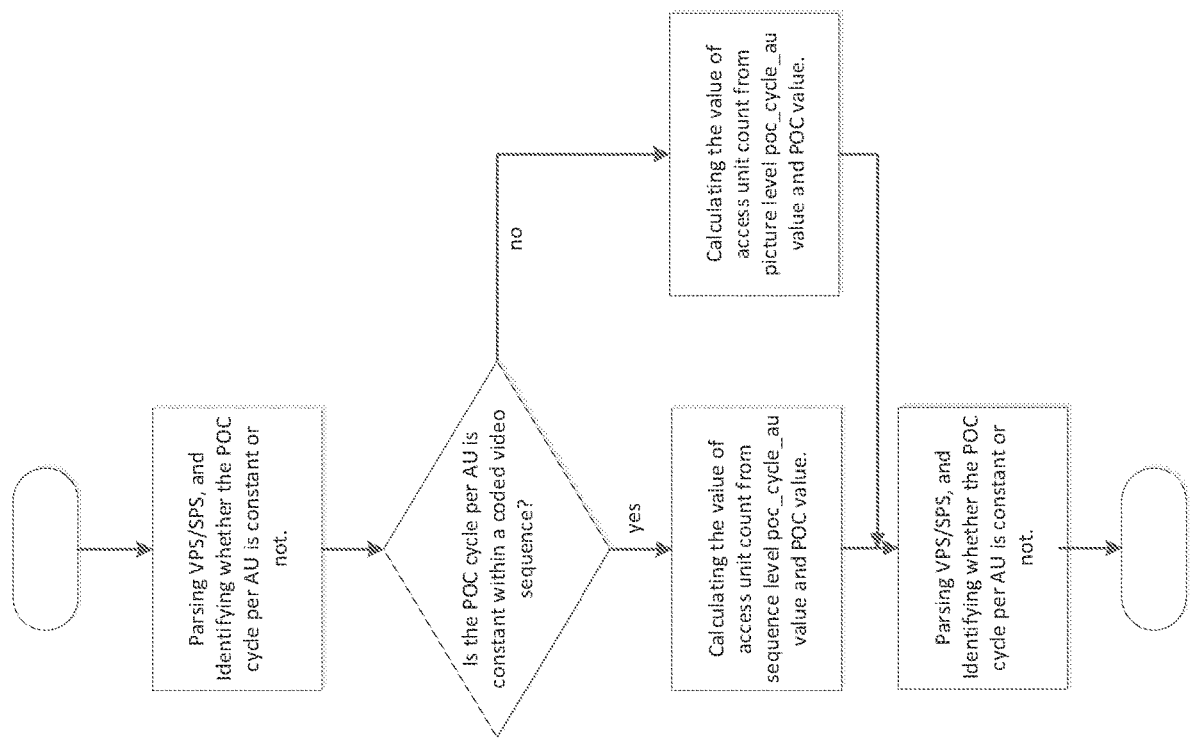
FIG. 10 is a schematic illustration of a simplified block diagram of parsing and decoding poc cycle per access unit and access unit count value.

In the same or another embodiment, FIG. 9 shows an example of syntax tables to signal the syntax element of vps_poc_cycle_au in VPS (or SPS), which indicates the poc_cycle_au used for all picture/slices in a coded video sequence, and the syntax element of slice_poc_cycle_au, which indicates the poc_cycle_au of the current slice, in slice header. If the POC value increases uniformly per AU, vps_contant_poc_cycle_per_au in VPS is set equal to 1 and vps_poc_cycle_au is signaled in VPS. In this case, slice_poc_cycle_au is not explicitly signaled, and the value of AUC for each AU is calculated by dividing the value of POC by vps_poc_cycle_au. If the POC value does not increase uniformly per AU, vps_contant_poc_cycle_per_au in VPS is set equal to 0. In this case, vps_access_unit_cnt is not signaled, while slice_access_unit_cnt is signaled in slice header for each slice or picture. Each slice or picture may have a different value of slice_access_unit_cnt. The value of AUC for each AU is calculated by dividing the value of POC by slice_poc_cycle_au. FIG. 10 shows a block diagram illustrating the relevant work flow.

In the same or other embodiments, even though the value of POC of a picture, slice, or tile may be different, the picture, slice, or tile corresponding to an AU with the same AUC value may be associated with the same decoding or output time instance. Hence, without any inter-parsing/decoding dependency across pictures, slices or tiles in the same AU, all or subset of pictures, slices or tiles associated with the same AU may be decoded in parallel, and may be outputted at the same time instance.

In the same or other embodiments, even though the value of POC of a picture, slice, or tile may be different, the picture, slice, or tile corresponding to an AU with the same AUC value may be associated with the same composition/display time instance. When the composition time is contained in a container format, even though pictures correspond to different AUs, if the pictures have the same composition time, the pictures can be displayed at the same time instance.

In the same or other embodiments, each picture, slice, or tile may have the same temporal identifier (temporal_id) in the same AU. All or subset of pictures, slices or tiles corresponding to a time instance may be associated with the same temporal sub-layer. In the same or other embodiments, each picture, slice, or tile may have the same or a different spatial layer id (layer_id) in the same AU. All or subset of pictures, slices or tiles corresponding to a time instance may be associated with the same or a different spatial layer.

Figure 11:
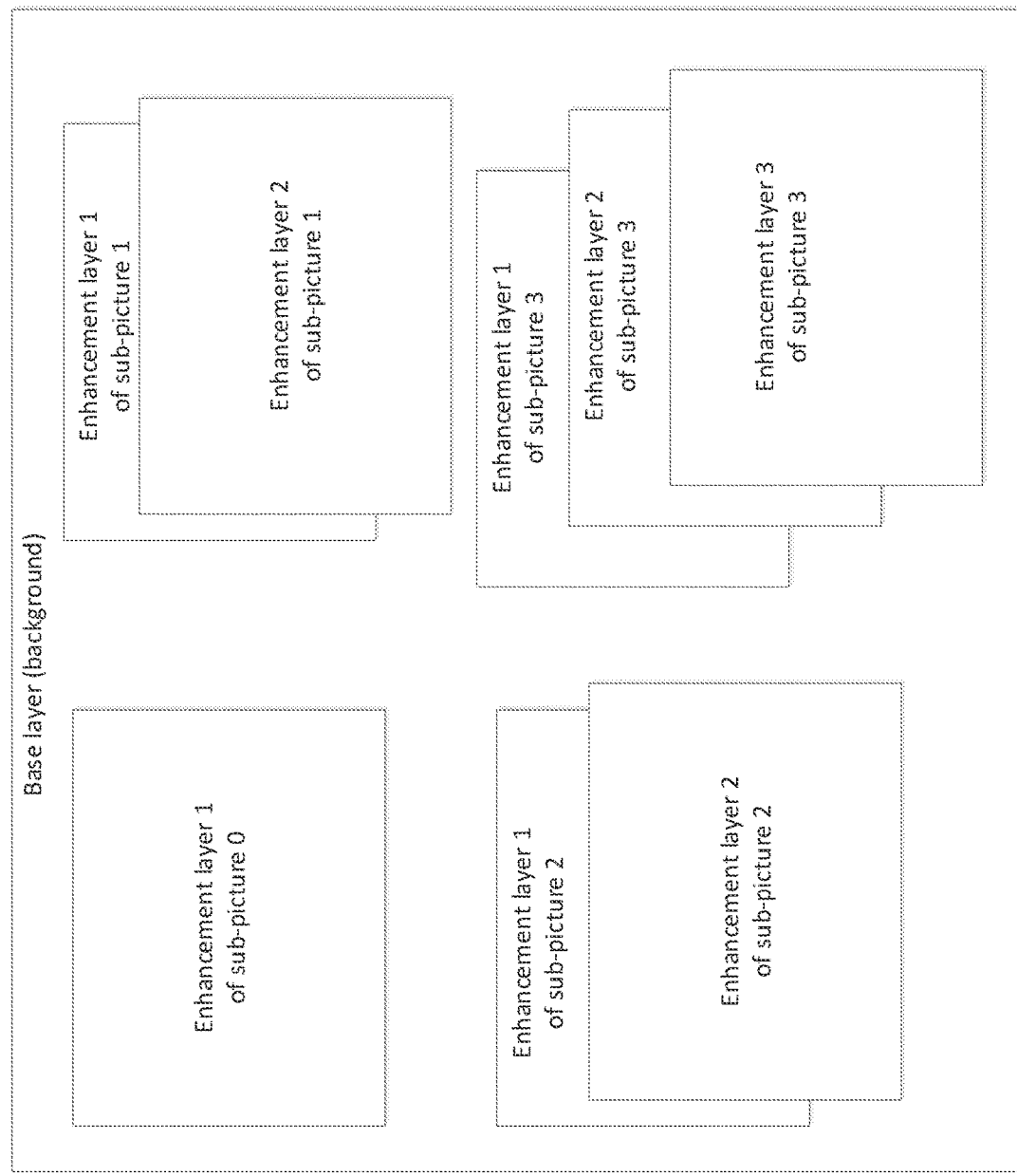
FIG. 11 is a schematic illustration of a video bitstream structure comprising multi-layered sub-pictures.

FIG. 11 shows an example video stream including a background video CSPS with layer_id equal to 0 and multiple foreground CSPS layers. While a coded sub-picture may consist of one or more CSPS layers, a background region, which does not belong to any foreground CSPS layer, may consist of a base layer. The base layer may contain a background region and foreground regions, while an enhancement CSPS layer contain a foreground region. An enhancement CSPS layer may have a better visual quality than the base layer, at the same region. The enhancement CSPS layer may reference the reconstructed pixels and the motion vectors of the base layer, corresponding to the same region.

In the same or another embodiment, the video bitstream corresponding to a base layer is contained in a track, while the CSPS layers corresponding to each sub-picture are contained in a separated track, in a video file.

In the same or another embodiment, the video bitstream corresponding to a base layer is contained in a track, while CSPS layers with the same layer_id are contained in a separated track. In this example, a track corresponding to a layer k includes CSPS layers corresponding to the layer k, only.

In the same or another embodiment, each CSPS layer of each sub-picture is stored in a separate track. Each trach may or may not have any parsing or decoding dependency from one or more other tracks.

In the same or another embodiment, each track may contain bitstreams corresponding to layer i to layer j of CSPS layers of all or a subset of sub-pictures, where $0<i=<j=<k$, k being the highest layer of CSPS.

In the same or another embodiment, a picture consists of one or more associated media data including depth map, alpha map, 3D geometry data, occupancy map, etc. Such associated timed media data can be divided to one or multiple data sub-stream each of which corresponding to one sub-picture.

Figure 12:
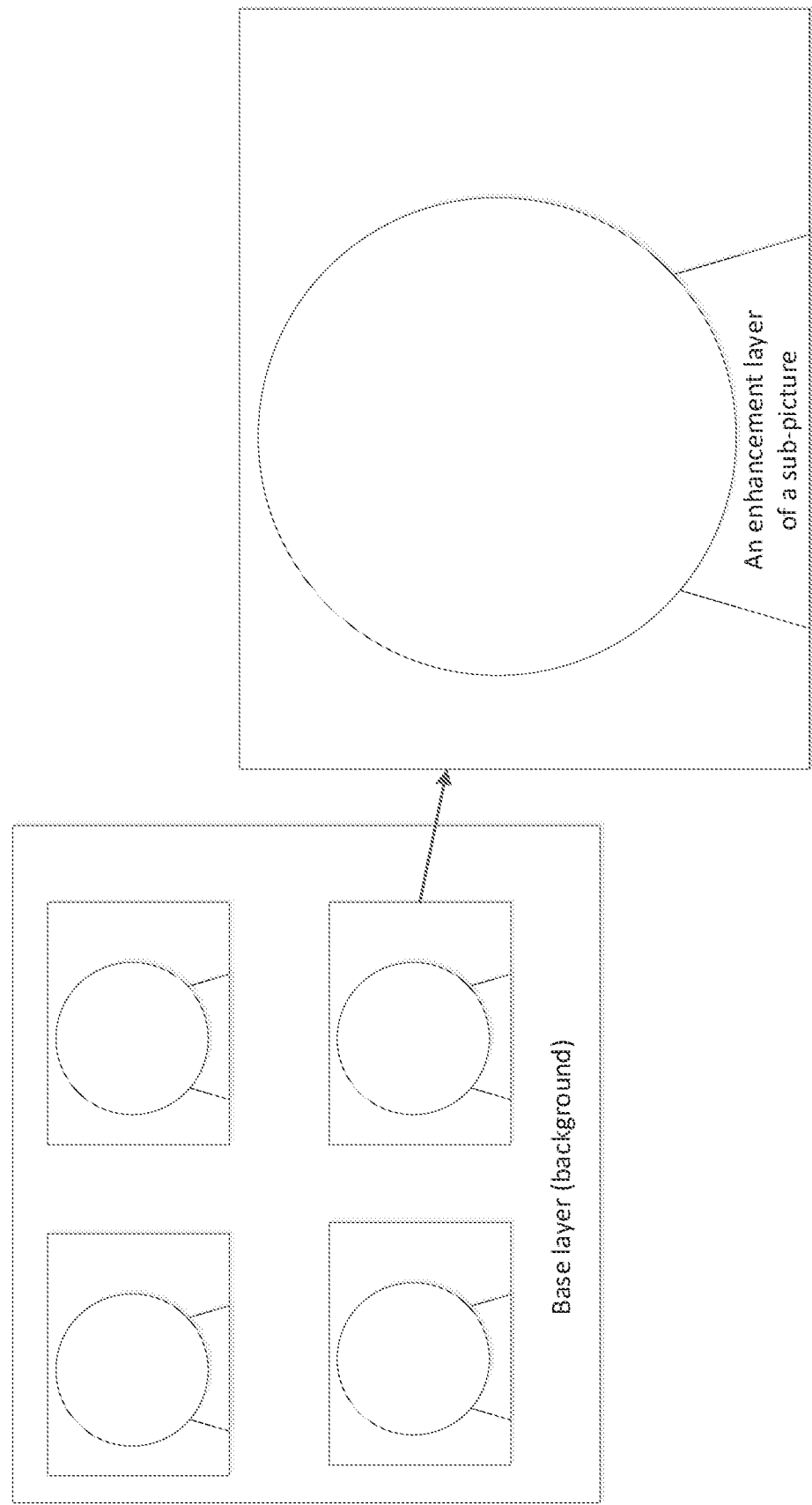
FIG. 12 is a schematic illustration of a display of the selected sub-picture with an enhanced resolution.
Figure 13:
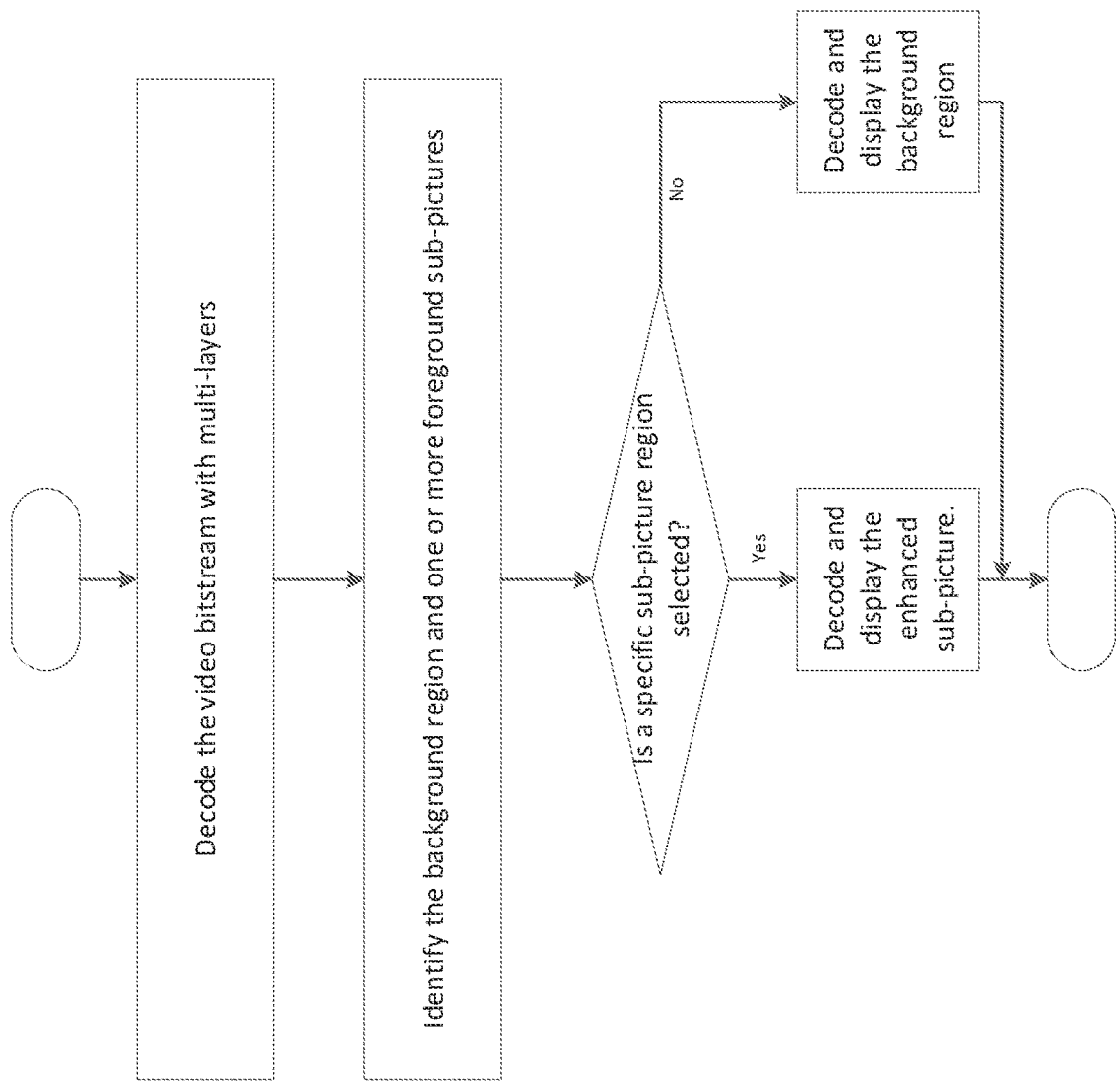
FIG. 13 is a block diagram of the decoding and display process for a video bitstream comprising multi-layered sub-pictures.

In the same or another embodiment, FIG. 12 shows an example of video conference based on the multi-layered sub-picture method. In a video stream, one base layer video bitstream corresponding to the background picture and one or more enhancement layer video bitstreams corresponding to foreground sub-pictures are contained. Each enhancement layer vide bitstream is corresponding to a CSPS layer. In a display, the picture corresponding to the base layer is displayed by default. It contains one or more user's picture in a picture (PIP). When a specific user is selected by a client's control, the enhancement CSPS layer corresponding to the selected user is decoded and displayed with the enhanced quality or spatial resolution. FIG. 13 shows the diagram for the operation.

In the same or another embodiment, a network middle box (such as router) may select a subset of layers to send to a user depending on its bandwidth. The picture/subpicture organization may be used for bandwidth adaptation. For instance, if the user doesn't have the bandwidth, the router strips of layers or selects some subpictures due to their importance or based on used setup and this can be done dynamically to adopt to bandwidth.

Figure 14:
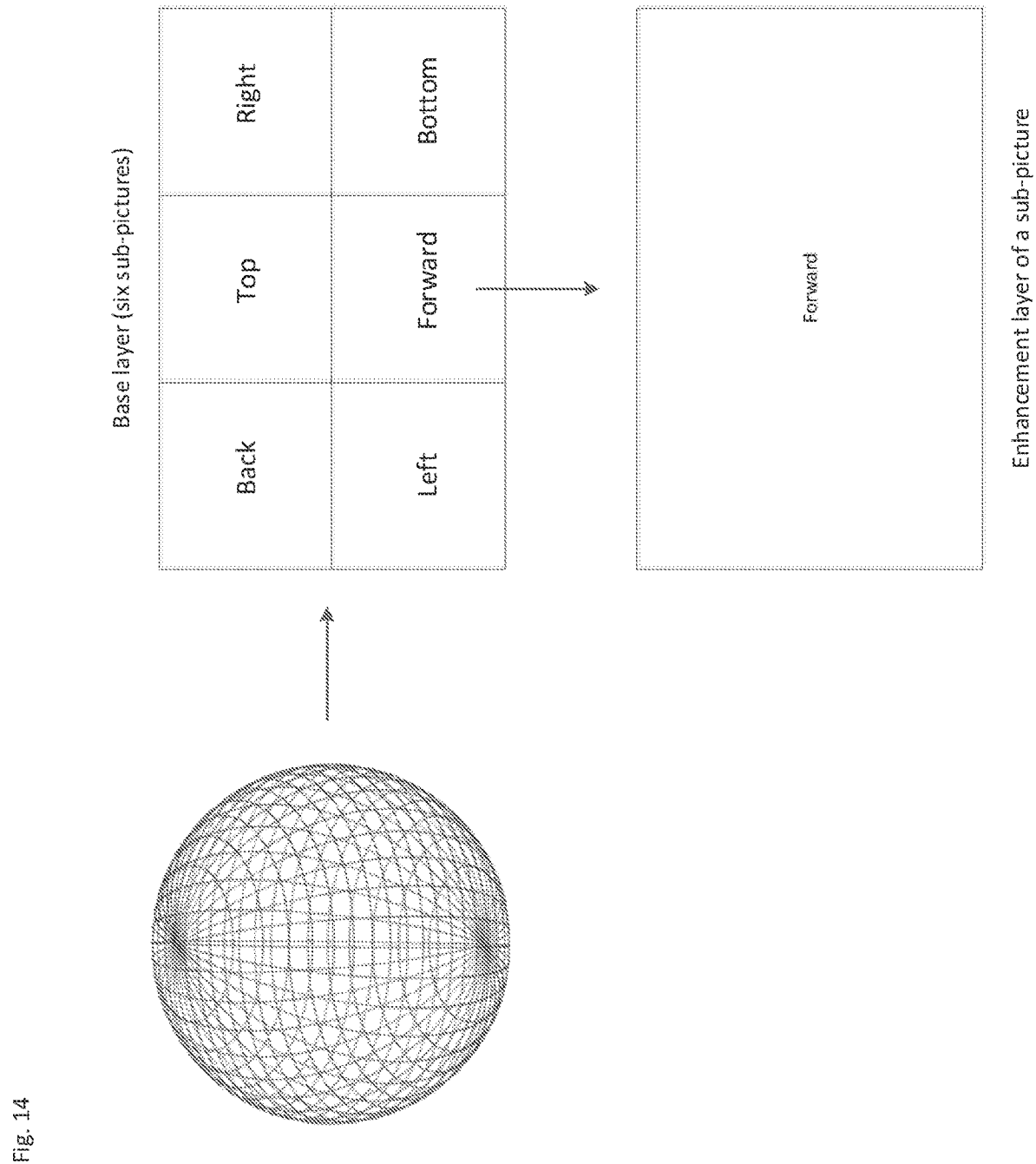
FIG. 14 is a schematic illustration of 360 video display with an enhancement layer of a sub-picture.

FIG. 14 shows a use case of 360 video. When a spherical 360 picture is projected onto a planar picture, the projection 360 picture may be partitioned into multiple sub-pictures as a base layer. An enhancement layer of a specific sub-picture may be coded and transmitted to a client. A decoder may be able to decode both the base layer including all sub-pictures and an enhancement layer of a selected sub-picture. When the current viewport is identical to the selected sub-picture, the displayed picture may have a higher quality with the decoded sub-picture with the enhancement layer. Otherwise, the decoded picture with the base layer can be displayed, with a low quality.

In the same or another embodiment, any layout information for display may be present in a file, as supplementary information (such as SEI message or metadata). One or more decoded sub-pictures may be relocated and displayed depending on the signaled layout information. The layout information may be signaled by a streaming server or a broadcaster, or may be regenerated by a network entity or a cloud server, or may be determined by a user's customized setting.

Figure 15:
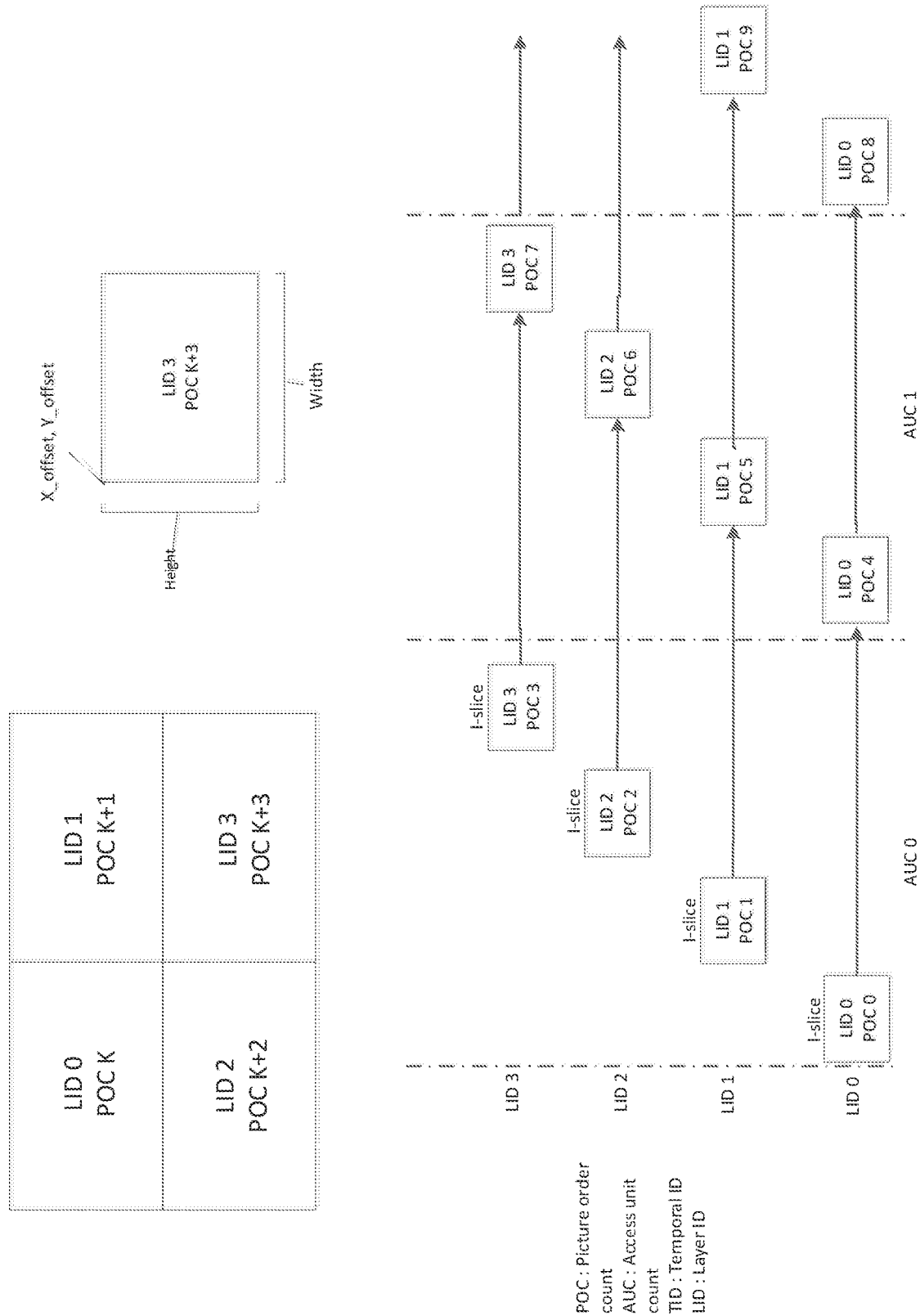
FIG. 15 is an example of a layout information of sub-pictures and its corresponding layer and picture prediction structure.

In an embodiment, when an input picture is divided into one or more (rectangular) sub-region(s), each sub-region may be coded as an independent layer. Each independent layer corresponding to a local region may have a unique layer_id value. For each independent layer, the sub-picture size and location information may be signaled. For example, picture size (width, height), the offset information of the left-top corner (x_offset, y_offset). FIG. 15 shows an example of the layout of divided sub-pictures, its sub-picture size and position information and its corresponding picture prediction structure. The layout information including the sub-picture size(s) and the sub-picture position(s) may be signaled in a high-level syntax structure, such as parameter set(s), header of slice or tile group, or SEI message.

In the same embodiment, each sub-picture corresponding to an independent layer may have its unique POC value within an AU. When a reference picture among pictures stored in DPB is indicated by using syntax element(s) in RPS or RPL structure, the POC value(s) of each sub-picture corresponding to a layer may be used.

In the same or another embodiment, in order to indicate the (inter-layer) prediction structure, the layer_id may not be used and the POC (delta) value may be used.

In the same embodiment, a sub-picture with a POC vale equal to N corresponding to a layer (or a local region) may or may not be used as a reference picture of a sub-picture with a POC value equal to N+K, corresponding to the same layer (or the same local region) for motion compensated prediction. In most cases, the value of the number K may be equal to the maximum number of (independent) layers, which may be identical to the number of sub-regions.

Figure 16:
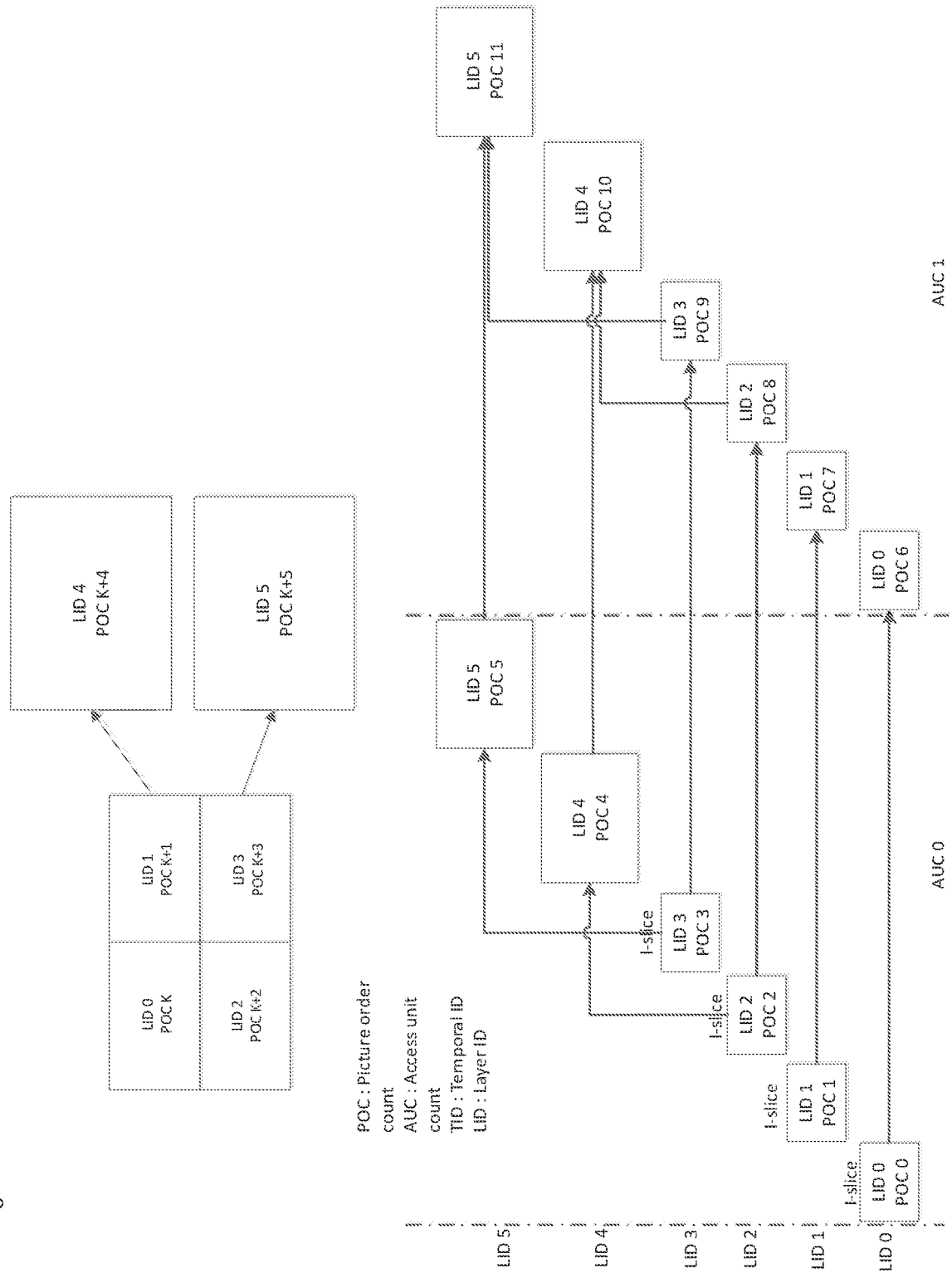
FIG. 16 is an example of a layout information of sub-pictures and its corresponding layer and picture prediction structure, with spatial scalability modality of local region.

In the same or another embodiment, FIG. 16 shows the extended case of FIG. 15. When an input picture is divided into multiple (e.g. four) sub-regions, each local region may be coded with one or more layers. In the case, the number of independent layers may be equal to the number of sub-regions, and one or more layers may correspond to a sub-region. Thus, each sub-region may be coded with one or more independent layer(s) and zero or more dependent layer(s).

In the same embodiment, in FIG. 16, the input picture may be divided into four sub-regions. The right-top sub-region may be coded as two layers, which are layer 1 and layer 4, while the right-bottom sub-region may be coded as two layers, which are layer 3 and layer 5. In this case, the layer 4 may reference the layer 1 for motion compensated prediction, while the layer 5 may reference the layer 3 for motion compensation.

In the same or another embodiment, in-loop filtering (such as deblocking filtering, adaptive in-loop filtering, reshaper, bilateral filtering or any deep-learning based filtering) across layer boundary may be (optionally) disabled.

In the same or another embodiment, motion compensated prediction or intra-block copy across layer boundary may be (optionally) disabled.

In the same or another embodiment, boundary padding for motion compensated prediction or in-loop filtering at the boundary of sub-picture may be processed optionally. A flag indicating whether the boundary padding is processed or not may be signaled in a high-level syntax structure, such as parameter set(s) (VPS, SPS, PPS, or APS), slice or tile group header, or SEI message.

In the same or another embodiment, the layout information of sub-region(s) (or sub-picture(s)) may be signaled in VPS or SPS. FIG. 17 shows an example of the syntax elements in VPS and SPS. In this example, vps_sub_picture_dividing_flag is signalled in VPS. The flag may indicate whether input picture(s) are divided into multiple sub-regions or not. When the value of vps_sub_picture_dividing_flag is equal to 0, the input picture(s) in the coded video sequence(s) corresponding to the current VPS may not be divided into multiple sub-regions. In this case, the input picture size may be equal to the coded picture size (pic_width_in_luma_samples, pic_height_in_luma_samples), which is signaled in SPS. When the value of vps_sub_picture_dividing_flag is equal to 1, the input picture(s) may be divided into multiple sub-regions. In this case, the syntax elements vps_full_pic_width_in_luma_samples and vps_full_pic_height_in_luma_samples are signaled in VPS. The values of vps_full_pic_width_in_luma_samples and vps_full_pic_height_in_luma_samples may be equal to the width and height of the input picture(s), respectively.

In the same embodiment, the values of vps_full_pic_width_in_luma_samples and vps_full_pic_height_in_luma_samples may not be used for decoding, but may be used for composition and display.

In the same embodiment, when the value of vps_sub_picture_dividing_flag is equal to 1, the syntax elements pic_offset_x and pic_offset_y may be signaled in SPS, which corresponds to (a) specific layer(s). In this case, the coded picture size (pic_width_in_luma_samples, pic_height_in_luma_samples) signaled in SPS may be equal to the width and height of the sub-region corresponding to a specific layer. Also, the position (pic_offset_x, pic_offset_y) of the left-top corner of the sub-region may be signaled in SPS.

In the same embodiment, the position information (pic_offset_x, pic_offset_y) of the left-top corner of the sub-region may not be used for decoding, but may be used for composition and display.

In the same or another embodiment, the layout information (size and position) of all or sub-set sub-region(s) of (an) input picture(s), the dependency information between layer(s) may be signaled in a parameter set or an SEI message. FIG. 18 shows an example of syntax elements to indicate the information o the layout of sub-regions, the dependency between layers, and the relation between a sub-region and one or more layers. In this example, the syntax element num_sub_region indicates the number of (rectangular) sub-regions in the current coded video sequence. the syntax element num_layers indicates the number of layers in the current coded video sequence. The value of num_layers may be equal to or greater than the value of num_sub_region. When any sub-region is coded as a single layer, the value of num_layers may be equal to the value of num_sub_region. When one or more sub-regions are coded as multiple layers, the value of num_layers may be greater than the value of num_sub_region. The syntax element direct_dependency_flag[i][j] indicates the dependency from the j-th layer to the i-th layer. num_layers_for_region[i] indicates the number of layers associated with the i-th sub-region. sub_region_layer_id[i][j] indicates the layer_id of the j-th layer associated with the i-th sub-region. The sub_region_offset_x[i] and sub_region_offset_y[i] indicate the horizontal and vertical location of the left-top corner of the i-th sub-region, respectively. The sub_region_width [i] and sub_region_height[i] indicate the width and height of the i-th sub-region, respectively.

In one embodiment, one or more syntax elements that specify the output layer set to indicate one of more layers to be outputted with or without profile tier level information may be signaled in a high-level syntax structure, e.g. VPS, DPS, SPS, PPS, APS or SEI message. Referring to FIG. 19, the syntax element num_output_layer_sets indicating the number of output layer set (OLS) in the coded vide sequence referring to the VPS may be signaled in the VPS. For each output layer set, output_layer_flag may be signaled as many as the number of output layers.

In the same embodiment, output_layer_flag[i] equal to 1 specifies that the i-th layer is output. vps_output_layer_flag [i] equal to 0 specifies that the i-th layer is not output.

In the same or another embodiment, one or more syntax elements that specify the profile tier level information for each output layer set may be signaled in a high-level syntax structure, e.g. VPS, DPS, SPS, PPS, APS or SEI message. Still referring to FIG. 19, the syntax element num_profile_tile_level indicating the number of profile tier level information per OLS in the coded vide sequence referring to the VPS may be signaled in the VPS. For each output layer set, a set of syntax elements for profile tier level information or an index indicating a specific profile tier level information among entries in the profile tier level information may be signaled as many as the number of output layers.

In the same embodiment, profile_tier_level_idx[i][j] specifies the index, into the list of profile_tier_level( ) syntax structures in the VPS, of the profile_tier_level( ) syntax structure that applies to the j-th layer of the i-th OLS.

In the same or another embodiment, referring to FIG. 20, the syntax elements num_profile_tile_level and/or num_output_layer_sets may be signaled when the number of maximum layers is greater than 1 (vps_max_layers_minus1>0).

In the same or another embodiment, referring to FIG. 20, the syntax element vps_output_layers_mode[i] indicating the mode of output layer signaling for the i-th output layer set may be present in VPS.

In the same embodiment, vps_output_layers_mode[i] equal to 0 specifies that only the highest layer is output with the i-th output layer set. vps_output_layer_mode[i] equal to 1 specifies that all layers are output with the i-th output layer set. vps_output_layer_mode[i] equal to 2 specifies that the layers that are output are the layers with vps_output_layer_flag[i][j] equal to 1 with the i-th output layer set. More values may be reserved.

In the same embodiment, the output_layer_flag[i][j] may or may not be signaled depending on the value of vps_output_layers_mode[i] for the i-th output layer set.

In the same or another embodiment, referring to FIG. 20, the flag vps_ptl_signal_flag[i] may be present for the i-th output layer set. Depending the value of vps_ptl_signal_flag [i], the profile tier level information for the i-th output layer set may or may not be signaled.

In the same or another embodiment, referring to FIG. 21, the number of subpicture, max_subpics_minus1, in the current CVS may be signalled in a high-level syntax structure, e.g. VPS, DPS, SPS, PPS, APS or SEI message.

In the same embodiment, referring to FIG. 21, the subpicture identifier, sub_pic_id[i], for the i-th subpicture may be signalled, when the number of subpictures is greater than 1 (max_subpics_minus1>0).

In the same or another embodiment, one or more syntax elements indicating the subpicture identifier belonging to each layer of each output layer set may be signalled in VPS. Referring to FIG. 22, the sub_pic_id_layer[i][j][k], which indicates the k-th subpicture present in the j-th layer of the i-th output layer set. With those information, a decoder may recognize which sub-picture may be decoded and outputted for each layer of a specific output layer set.

In an embodiment, picture header (PH) is a syntax structure containing syntax elements that apply to all slices of a coded picture. A picture unit (PU) is a set of NAL units that are associated with each other according to a specified classification rule, are consecutive in decoding order, and contain exactly one coded picture. A PU may contain a picture header (PH) and one or more video coding layer (VCL) NAL units composing a coded picture.

In an embodiment, an SPS (RBSP) may be available to the decoding process prior to it being referenced, included in at least one AU with TemporalId equal to 0 or provided through external means.

In an embodiment, an SPS (RBSP) may be available to the decoding process prior to it being referenced, included in at least one AU with TemporalId equal to 0 in the CVS, which contains one or more PPS referring to the SPS, or provided through external means.

In an embodiment, an SPS (RBSP) may be available to the decoding process prior to it being referenced by one or more PPS, included in at least one PU with nuh_layer_id equal to the lowest nuh_layer_id value of the PPS NAL units that refer to the SPS NAL unit in the CVS, which contains one or more PPS referring to the SPS, or provided through external means.

In an embodiment, an SPS (RBSP) may be available to the decoding process prior to it being referenced by one or more PPS, included in at least one PU with TemporalId equal to 0 and nuh_layer_id equal to the lowest nuh_layer_id value of the PPS NAL units that refer to the SPS NAL unit or provided through external means.

In an embodiment, an SPS (RBSP) may be available to the decoding process prior to it being referenced by one or more PPS, included in at least one PU with TemporalId equal to 0 and nuh_layer_id equal to the lowest nuh_layer_id value of the PPS NAL units that refer to the SPS NAL unit in the CVS, which contains one or more PPS referring to the SPS, or provided through external means or provided through external means.

In the same or another embodiment, pps_seq_parameter_set_id specifies the value of sps_seq_parameter_set_id for the referenced SPS. The value of pps_seq_parameter_set_id may be the same in all PPSs that are referred to by coded pictures in a CLVS.

In the same or another embodiment, all SPS NAL units with a particular value of sps_seq_parameter_set_id in a CVS may have the same content.

In the same or another embodiment, regardless of the nuh_layer_id values, SPS NAL units may share the same value space of sps_seq_parameter_set_id.

In the same or another embodiment, the nuh_layer_id value of a SPS NAL unit may be equal to the lowest nuh_layer_id value of the PPS NAL units that refer to the SPS NAL unit.

In an embodiment, when an SPS with nuh_layer_id equal to m is referred to by one or more PPS with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, a PPS (RBSP) shall be available to the decoding process prior to it being referenced, included in at least one AU with Temporand equal to the Temporand of the PPS NAL unit or provided through external means.

In an embodiment, a PPS (RBSP) may be available to the decoding process prior to it being referenced, included in at least one AU with Temporand equal to the Temporand of the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with Temporand equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, ph_pic_parameter_set_id in PH specifies the value of pps_pic_parameter_set_id for the referenced PPS in use. The value of pps_seq_parameter_set_id may be the same in all PPSs that are referred to by coded pictures in a CLVS.

In the same or another embodiment, All PPS NAL units with a particular value of pps_pic_parameter_set_id within a PU shall have the same content.

In the same or another embodiment, regardless of the nuh_layer_id values, PPS NAL units may share the same value space of pps_pic_parameter_set_id.

In the same or another embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with nuh_layer_id equal to n. the layer with nuh_layer_id equal to m may be the same as the layer with nuh_layer_id equal to n or a (direct or indirect) reference layer of the layer with nuh_layer_id equal to m.

In the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with Temporand equal to the TemporalId of the PPS NAL unit and nuh_layer_id equal to the lowest nuh_layer_id value of the coded slice NAL units that refer to the PPS NAL unit in the CVS, which contains one or more PHs (or coded slice NAL units) referring to the PPS, or provided through external means.

In the same or another embodiment, ph_pic_parameter_set_id in PH specifies the value of pps_pic_parameter_set_id for the referenced PPS in use. The value of pps_seq_parameter_set_id may be the same in all PPSs that are referred to by coded pictures in a CLVS.

In the same or another embodiment, All PPS NAL units with a particular value of pps_pic_parameter_set_id within a PU shall have the same content.

In the same or another embodiment, regardless of the nuh_layer_id values, PPS NAL units may share the same value space of pps_pic_parameter_set_id.

In the same or another embodiment, the nuh_layer_id value of a PPS NAL unit may be equal to the lowest nuh_layer_id value of the coded slice NAL units that refer to the NAL unit that refer to the PPS NAL unit.

In an embodiment, when a PPS with nuh_layer_id equal to m is referred to by one or more coded slice NAL units with nuh_layer_id equal to n. the layer with nuh_layer_id equal to m may be the same as the layer with nuh_layer_id equal to n or a (direct or indirect) reference layer of the layer with nuh_layer_id equal to m.

In an embodiment, as shown in FIG. 22, pps_subpic_id[i] in picture parameter set specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
    if( subpic_id_mapping_explicitly_signalled_flag )
        SubpicIdVal[ i ] = subpic_id_mapping_in_pps_flag ? pps_subpic_id[ i ] : sps_subpic_id[ i ]    (80)
    else
        SubpicIdVal[ i ] = i
``` equal to n or a (direct or indirect) reference layer of the layer with nuh_layer_id equal to m.

In an embodiment, a PPS (RBSP) shall be available to the decoding process prior to it being referenced, included in at least one AU with Temporand equal to the Temporand of the PPS NAL unit or provided through external means.

In an embodiment, a PPS (RBSP) may be available to the decoding process prior to it being referenced, included in at least one AU with Temporand equal to the Temporand of the PPS NAL unit in the CVS, which contains one or more PHs (or coded slice NAL units) referring to the PPS, or provided through external means.

In an embodiment, a PPS (RBSP) may be available to the decoding process prior to it being referenced by one or more PHs (or coded slice NAL units), included in at least one PU with nuh_layer_id equal to the lowest nuh_layer_id value of the coded slice NAL units that refer to the PPS NAL unit in In the same or another embodiment, for any two different values of i and j in the range of 0 to sps_num_subpics_minus1, inclusive, SubpicIdVal[i] may not be equal to SubpicIdVal[j].

In the same or another embodiment, when the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i may be equal to a particular value in the range of IDR_W_RADL to CRA_NUT, inclusive.

In the same or another embodiment, when the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, sps_independent_subpics_flag may be equal to 1.

In the same or another embodiment, when the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, subpic_treated_as_pic_flag[i] and loop_filter_across_subpic_enabled_flag[i] may be equal to 1.

In the same or another embodiment, when the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, sps_independent_subpics_flag shall be equal to 1 or subpic_treated_as_pic_flag[i] and loop_filter_across_subpic_enabled_flag[i] shall be equal to 1.

In the same or another embodiment, when a subpicture is independently encoded without any reference to another subpicture, the value of subpicture identifier of a region may be changed within a coded video sequence.

The samples are processed in units of CTBs. The array size for each luma CTB in both width and height is CtbSizeY in units of samples. The width and height of the array for each chroma CTB are CtbWidthC and CtbHeightC, respectively, in units of samples. Each CTB is assigned a partition signalling to identify the block sizes for intra or inter prediction and for transform coding. The partitioning is a recursive quadtree partitioning. The root of the quadtree is associated with the CTB. The quadtree is split until a leaf is reached, which is referred to as the quadtree leaf. When the component width is not an integer number of the CTB size, the CTBs at the right component boundary are incomplete. When the component height is not an integer multiple of the CTB size, the CTBs at the bottom component boundary are incomplete.

The width and height information of each subpicture may be signaled in SPS in units of CtbSizeY. In FIG. 23, for example, subpic_width_minus1 [i] plus 1 specifies the width of the i-th subpicture in units of CtbSizeY. The length of the syntax element is Ceil(Log 2((pic_width_max_in_luma_samples+CtbSizeY−1)>>CtbLog 2SizeY)) bits. When not present, the value of subpic_width_minus1 [i] is inferred to be equal to ((pic_width_max_in_luma_samples+CtbSizeY−1)>>CtbLog 2SizeY)−subpic_ctu_top_left_x[i]−1. subpic_height_minus1[i] plus 1 specifies the height of the i-th subpicture in units of CtbSizeY. The length of the syntax element is Ceil(Log 2((pic_height_max_in_luma_samples+CtbSizeY−1)>>CtbLog 2SizeY)) bits. When not present, the value of subpic_height_minus1[i] is inferred to be equal to ((pic_height_max_in_luma_samples+CtbSizeY−1)>>CtbLog 2SizeY)−subpic_ctu_top_left_y[i]−1.

The width of each subpicture may be greater than or equal to CtbSizeY, when the picture width is greater than or equal to CtbSizeY. The height of each subpicture may be greater than or equal to CtbSizeY, when the picture height is greater than or equal to CtbSizeY.

If the picture width is not greater than CtbSizeY and the picture height is not greater than CtbSizeY, the picture may not be partitioned into more than one subpicture. In the case, the number of subpictures may be equal to 1.

When pic_width_max_in_luma_samples is not greater than CtbSizeY and pic_height_max_in_luma_samples is not greater than CtbSizeY, the value of subpic_info_present_flag shall be equal to 0. When subpic_info_present_flag is equal to 0, no explicit signaling is present for subpicture partitioning information and the number of subpicture in the picture is equal to 1.

In the same or another embodiment, sps_subpic_id_len_minus1 plus 1 specifies the number of bits used to represent the syntax element sps_subpic_id[i], the syntax elements pps_subpic_id[i], when present, and the syntax element slice_subpic_id, when present. The value of sps_subpic_id_len_minus1 may be in the range of 0 to 15, inclusive. The value of 1<<(sps_subpic_id_len_minus1) may be greater than or equal to sps_num_subpics_minus1+1.

In the same or another embodiment, when the number of subpictures is equal to 1, subpic_info_present_flag may be equal to 0 and the subpicture partitioning information may not be explicitly signalled, because the subpicture width and height information is equal to the picture width and height information and the left-top position of the subpicture is equal to the left-top position of the picture in that case.

For example, subpic_ctu_top_left_x[i] specifies horizontal position of top left CTU of i-th subpicture in unit of CtbSizeY. The length of the syntax element is Ceil(Log 2((pic_width_max_in_luma_samples+CtbSizeY−1)>>CtbLog 2SizeY)) bits. When not present, the value of subpic_ctu_top_left_x[i] is inferred to be equal to 0. subpic_ctu_top_left_y[i] specifies vertical position of top left CTU of i-th subpicture in unit of CtbSizeY. The length of the syntax element is Ceil(Log 2((pic_height_max_in_luma_samples+CtbSizeY−1)>>CtbLog 2SizeY)) bits. When not present, the value of subpic_ctu_top_left_y[i] is inferred to be equal to 0. subpic_width_minus1 [i] plus 1 specifies the width of the i-th subpicture in units of CtbSizeY. The length of the syntax element is Ceil(Log 2((pic_width_max_in_luma_samples+CtbSizeY−1)>>CtbLog 2SizeY)) bits. When not present, the value of subpic_width_minus1 [i] is inferred to be equal to ((pic_width_max_in_luma_samples+CtbSizeY−1)>>CtbLog 2SizeY)−subpic_ctu_top_left_x[i]−1. subpic_height_minus1[i] plus 1 specifies the height of the i-th subpicture in units of CtbSizeY. The length of the syntax element is Ceil(Log 2((pic_height_max_in_luma_samples+CtbSizeY−1)>>CtbLog 2SizeY)) bits. When not present, the value of subpic_height_minus1 [i] is inferred to be equal to ((pic_height_max_in_luma_samples+CtbSizeY−1)>>CtbLog 2SizeY)−subpic_ctu_top_left_y[i]−1.

In the same or another embodiment, when the number of subpictures is greater than 1, subpic_info_present_flag may be equal to 1 and the subpicture partitioning information may be explicitly signaled in a parameter set, as shown in FIG. 23.

For example, in FIG. 23, sps_num_subpics_minus2 plus 2 specifies the number of subpictures in each picture in the CLVS. The value of sps_num_subpics_minus2 may be in the range of 0 to Ceil(pic_width_max_in_luma_samples÷CtbSizeY)*Ceil(pic_height_max_in_luma_samples÷CtbSizeY)−2, inclusive. When not present, the value of sps_num_subpics_minus2 is inferred to be equal to 0.

In the same embodiment, the lists SubpicWidthInTiles[i] and SubpicHeightInTiles[i], for i ranging from 0 to sps_num_subpics_minus1, inclusive, specifying the width and the height of the i-th subpicture in tile columns and rows, respectively, and the list subpicHeightLessThanOneTileFlag[i], for i ranging from 0 to sps_num_subpics_minus1, inclusive, specifying whether the height of the i-th subpicture is less than one tile row, are derived as follows:

```
for( i = 0; i <= sps_num_subpics_minus2 + 1; i++ ) {
    leftX = subpic_ctu_top_left_x[ i ]
    rightX = leftX + subpic_width_minus1[ i ]
    SubpicWidthInTiles[ i ] = ctbToTileColIdx[ rightX ] + 1 - ctbToTileColIdx[ leftX ]
    (29)
    topY = subpic_ctu_top_left_y[ i ]
    bottomY = topY + subpic_height_minus1[ i ]
    SubpicHeightInTiles[ i ] =
CtbToTileRowIdx[ bottomY ] + 1 - CtbToTileRowIdx[ topY ]
    if( SubpicHeightInTiles[ i ] = = 1 &&
            subpic_height_minus1[ i ] + 1 <
    RowHeight[ ctbToTileRowIdx[ topY ] ] )
        subpicHeightLessThanOneTileFlag[ i ] = 1
else
        subpicHeightLessThanOneTileFlag[ i ] = 0
}
```

When rect_slice_flag is equal to 1, the list NumCtusInSlice[i] for i ranging from 0 to num_slices_in_pic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, are derived as follows:

```
if( single_slice_per_subpic_flag ) {
    for( i = 0; i <= sps_num_subpics_minus2 + 1; i++ ) {
        NumCtusInSlice[ i ] = 0
        if( subpicHeightLessThanOneTileFlag[ i ] ) /* The slice consists of a number of
CTU rows in a tile. */
            AddCtbsToSlice( i, subpic_ctu_top_left_x[ i ],
                    subpic_ctu_top_left_x[ i ] + subpic_width_minus1[ i ] + 1,
subpic_ctu_top_left_y[ i ],
                    subpic_ctu_top_left_y[ i ] + subpic_height_minus1[ i ] + 1 )
            else { /* The slice consists of a number of complete tiles covering a rectangular
region. */
                tileX = CtbToTileColBd[ subpic_ctu_top_left_x[ i ] ]
                tileY = CtbToTileRowBd[ subpic_ctu_top_left_y[ i ] ]
                for( j = 0; j < SubpicHeightInTiles[ i ]; j++ )
                    for( k = 0; k < SubpicWidthInTiles[ i ]; k++ )
                        AddCtbsToSlice( i, tileColBd[ tileX + k ],
tileColBd[ tileX + k + 1 ], tileRowBd[ tileY + j ],
                                    tileRowBd[ tileY + j + 1 ] )
            }
        }
    } else {
        tileIdx = 0
        for( i = 0; i <= num_slices_in_pic minus1; i++ )
            NumCtusInSlice[ i ] = 0
        for( i = 0; i <= num_slices_in_pic_minus1; i++ ) {
            SliceTopLeftTileIdx[ i ] = tileIdx
            tileX = tileIdx % NumTileColumns
            tileY = tileIdx / NumTileColumns
            if( i < num_slices_in_pic_minus1 ) {
                sliceWidthInTiles[ i ] = slice_width_in_tiles_minus1[ i ] + 1
                sliceHeightInTiles[ i ] = slice_height_in_tiles_minus1[ i ] + 1
            } else {
                sliceWidthInTiles[ i ] = NumTileColumns - tileX
                sliceHeightInTiles[ i ] = NumTileRows - tileY
                NumSlicesInTile[ i ] = 1
            }
            if( slicWidthInTiles[ i ] = = 1 && sliceHeightInTiles[ i ] = = 1 ) { (30)
                if( num_exp_slices_in_tile[ i ] = = 0 ) {
                    NumSlicesInTile[ i ] = 1
                    sliceHeightInCtus[ i ] =
RowHeight[ SliceTopLeftTileIdx[ i ] / NumTileColumns ]
                } else {
                    remainingHeightInCtbsY =
RowHeight[ SliceTopLeftTileIdx[ i ] / NumTileColumns ]
                    for( j = 0; j < num_exp_slices_in_tile[ i ] - 1; j++ ) {
                        sliceHeightInCtus[ i + j ] =
exp_slice_height_in_ctus_minus1[ i ][ j ] + 1
                        remainingHeightInCtbsY -= sliceHeightInCtus[ i + j ]
                    }
                    uniformSliceHeight = exp_slice_height_in_ctus_minus1[ i ][ j ] + 1
                    while( remainingHeightInCtbsY >= uniformSliceHeight ) {
                        sliceHeightInCtus[ i + j ] = uniformSliceHeight
```

```
                remainingHeightInCtbsY -= uniformSliceHeight
                j++
            }
            if( remainingHeightInCtbsY > 0 ) {
                sliceHeightInCtus[ i + j ] = remainingHeightInCtbsY
                j++
            }
            NumSlicesInTile[ i ] = j
        }
        ctbY = tileRowBd[ tileY ]
        for( j = 0; j < NumSlicesInTile[ i ]; j++ ) {
            AddCtbsToSlice( i + j, tileColBd[ tileX ], tileColBd[ tileX + 1 ],
                    ctbY, ctbY + sliceHeightInCtus[ i + j ] )
            ctbY += sliceHeightInCtus[ i + j ]
        }
        i += NumSlicesInTile[ i ] - 1
    } else
        for( j = 0; j < sliceHeightInTiles[ i ]; j++ )
            for( k = 0; k < sliceWidthInTiles[ i ]; k++ )
                AddCtbsToSlice( i, tileColBd[ tileX + k ],
tileColBd[ tileX + k + 1 ],
                    tileRowBd[ tileY + j ], tileRowBd[ tileY + j + 1 ] )
    if( i < num_slices_in_pic_minus1 ) {
        if( tile_idx_delta_present_flag )
            tileIdx += tile_idx_delta[ i ]
        else {
            tileIdx += sliceWidthInTiles[ i ]
            if( tileIdx % NumTileColumns = = 0 )
                tileIdx +=
( sliceHeightInTiles[ i ] - 1 ) * NumTileColumns
        }
    }
  }
}
```

Two or more independently coded subpictures may be merged into a coded picture, so that the coded picture may be decoded and outputted as a single picture.

When two or more independently coded subpictures are merged into a coded picture, a coded picture may consist of VCL NAL units with two or more different NAL unit types.

In FIG. 23, a flag mixed_nalu_types_in_pic flag may be signaled in a parameter set (e.g. PPS, SPS). mixed_nalu_types_in_pic flag equal to 1 specifies that each picture referring to the PPS has more than one VCL NAL unit and the VCL NAL units do not have the same value of nal_unit_type. mixed_nalu_types_in_pic flag equal to 0 specifies that each picture referring to the PPS has one or more VCL NAL units and the VCL NAL units of each picture referring to the PPS have the same value of nal_unit_type.

When mixed_nalu_types_in_pic flag in a PPS is equal to 1, each picture with mixed_nalu_types_in_pic flag is equal to 1 is handled as a trailing picture. Hence, a coded picture with two or more different NAL unit types may be decoded as a trailing picture. When the picture is referenced by the subsequent pictures in decoding order, the picture may be handled as a trailing picture.

In FIG. 23, sps_independent_subpics_flag equal to 1 specifies that all subpicture boundaries in the CLVS are treated as picture boundaries and there is no loop filtering across the subpicture boundaries. sps_independent_subpics_flag equal to 0 does not impose such a constraint. When not present, the value of sps_independent_subpics_flag is inferred to be equal to 0.

In FIG. 23, subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag. When subpic_treated_as_pic_flag[i] is equal to 1, it is a requirement of bitstream conformance that all of the following conditions are true for each output layer and its reference layers in an OLS that includes the layer containing the i-th subpicture as an output layer:

All pictures in the output layer and its reference layers shall have the same value of pic_width_in_luma_samples and the same value of pic_height_in_luma_samples.
  All the SPSs referred to by the output layer and its reference layers shall have the same value of sps_num_subpics_minus1 and shall have the same values of subpic_ctu_top_left_x[j], subpic_ctu_top_left_y[j], subpic_width_minus1[j], subpic_height_minus1 [j], and loop_filter_across_subpic_enabled_flag[j], respectively, for each value of j in the range of 0 to sps_num_subpics_minus1, inclusive.
  All pictures in each access unit in the output layer and its reference layers shall have the same value of SubpicIdVal[j] for each value of j in the range of 0 to sps_num_subpics_minus1, inclusive.

In FIG. 23, loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1−sps_independent_subpics_flag.

When two or more coded subpictures are merged into a coded picture, those coded subpictures may not have any parsing or decoding dependency from each other.

In an embodiment, when a mixed_nalu_types_in_pic_flag in a PPS is equal to 1, the values of subpic_treated_as_pic_flag[ ] of subpictures referring to the PPS may be equal to 1.

In an embodiment, when sps_independent_subpics_flag is equal to 0 and one or more subpic_treated_as_pic_flag[ ] values are not equal to 1, mixed_nalu_types_in_pic_flag may be equal to 0.

In an embodiment, when mixed_nalu_types_in_pic_flag is equal to 1, the value of sps_independent_subpics_flag may be equal to 1.

In an embodiment, when mixed_nalu_types_in_pic_flag in a PPS is equal to 1, the values of subpic_treated_as_pic_flag[ ] of subpictures referring to the PPS is inferred to equal to 1.

In an embodiment, when two or more neighboring subpictures with different NAL unit types within a picture shall have the value of subpic_treated_as_pic_flag[ ] equal to 1.

In an embodiment, FIG. 24, the subpicture partitioning information may be signaled in PPS. For example, pps_independent_subpics_flag equal to 1 specifies that all boundaries subpictures referring to the PPS are treated as picture boundaries and there is no loop filtering across the subpicture boundaries. pps_independent_subpics_flag equal to 0 does not impose such a constraint. When not present, the value of pps_independent_subpics_flag is inferred to be equal to 0. pps_subpic_treated_as_pic_flag[i] equal to 1 specifies that the i-th subpicture of each coded picture referring to the PPS is treated as a picture in the decoding process excluding in-loop filtering operations. pps_subpic_treated_as_pic_flag[i] equal to 0 specifies that the i-th subpicture of each coded picture referring to the PPS is not treated as a picture in the decoding process excluding in-loop filtering operations. When not present, the value of pps_subpic_treated_as_pic_flag[i] is inferred to be equal to pps_independent_subpics_flag. pps_loop_filter_across_subpic_enabled_flag[i] equal to 1 specifies that in-loop filtering operations may be performed across the boundaries of the i-th subpicture in each coded picture referring to the PPS. pps_loop_filter_across_subpic_enabled_flag[i] equal to 0 specifies that in-loop filtering operations are not performed across the boundaries of the i-th subpicture in each coded picture referring to the PPS. When not present, the value of pps_loop_filter_across_subpic_enabled_pic_flag[i] is inferred to be equal to 1−pps_independent_subpics_flag.

In the same embodiment, when a mixed_nalu_types_in_pic_flag in a PPS is equal to 1, the values of pps_subpic_treated_as_pic_flag[ ] shall be equal to 1.

In the same or another embodiment, when mixed_nalu_types_in_pic_flag is equal to 1, pps_independent_subpics_flag shall be equal to 1.

In the same or another embodiment, when mixed_nalu_types_in_pic_flag is equal to 1, pps_subpic_treated_as_pic_flag[ ] shall be equal to 1.

In an embodiment, when mixed_nalu_types_in_pic_flag is equal to 1 and at least a VCL NAL unit of a picture has nal_unit_type equal to CRA_NUT, the CRA subpicture or picture may not be handled as a CVS start picture.

In an embodiment, when mixed_nalu_types_in_pic_flag is equal to 1 and at least a VCL NAL unit of a picture has nal_unit_type equal to CRA_NUT, the leading picture associated with the CRA subpicture or picture may be outputted.

In the same embodiment, when mixed_nalu_types_in_pic_flag is equal to 1 and at least a VCL NAL unit of a picture has nal_unit_type equal to CRA_NUT, HandleCraAsCvsStartFlag and NoOutputBeforeRecoveryFlag for the picture are both set equal to 0.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for coding video data, executable by a processor, comprising:
    receiving video data comprising one or more subpictures;
    identifying a network abstraction layer (NAL) unit type associated with each of the one or more subpictures based on checking a flag corresponding to mixed NAL units in the one or more subpictures; and
    decoding the video data based on the identified NAL unit types, wherein a picture with two or more NAL unit types associated with the one or more subpictures is decoded as a trailing picture, and wherein boundaries associated with the one or more subpictures are treated as picture boundaries without loop filtering across the boundaries based on the picture with two or more NAL unit types being associated with the one or more subpictures.

2. The method of claim 1, wherein a HandleCraAsCvsStartFlag flag being equal to one indicates a current picture is a start point of a current coded video sequence.

3. The method of claim 2, wherein based on a presence of mixed NAL unit types and a video coding layer NAL unit having a clean random access type, the HandleCraAsCvsStartFlag flag and a NoOutputBeforeRecoveryFlag flag for the video data are both set equal to 0.

4. The method of claim 3, wherein based on the HandleCraAsCvsStartFlag being set equal to 0, a current subpicture is not be handled as a coded video sequence start picture.

5. The method of claim 2, wherein based on a presence of mixed NAL unit types and a video coding layer NAL unit having a clean random access type, a leading picture associated with the video data is output.

6. The method of claim 5, wherein HandleCraAsCvsStartFlag and NoOutputBeforeRecoveryFlag flags for the video data are both set equal to 0.

7. The method of claim 6, wherein based on the presence of mixed NAL unit types, a pps_subpic_treated_as_pic_flag flag is set equal to 1.

8. A computer system for coding video data, the computer system comprising:
    one or more computer-readable non-transitory storage media configured to store computer program code; and
    one or more computer processors configured to access said computer program code and operate as instructed by said computer program code, said computer program code including:
        receiving code configured to cause the one or more computer processors to receive video data comprising one or more subpictures;
        identifying code configured to cause the one or more computer processors to identify a network abstraction layer (NAL) unit type associated with each of the one or more subpictures based on checking a flag corresponding to mixed NAL units in the one or more subpictures; and decoding code configured to cause the one or more computer processors to decode the video data based on the identified NAL unit types, wherein a picture with two or more NAL unit types associated with the one or more subpictures is decoded as a trailing picture, and wherein boundaries associated with the one or more subpictures are treated as picture boundaries without loop filtering across the boundaries based on the picture with two or more NAL unit types being associated with the one or more subpictures.

9. The computer system of claim 8, wherein a HandleCraAsCvsStartFlag flag being equal to one indicates a current picture is a start point of a current coded video sequence.

10. The computer system of claim 9, wherein based on a presence of mixed NAL unit types and a video coding layer NAL unit having a clean random access type, the HandleCraAsCvsStartFlag flag and a NoOutputBeforeRecoveryFlag flag for the video data are both set equal to 0.

11. The computer system of claim 10, wherein based on the HandleCraAsCvsStartFlag being set equal to 0, a current subpicture is not be handled as a coded video sequence start picture.

12. The computer system of claim 9, wherein based on a presence of mixed NAL unit types and a video coding layer NAL unit having a clean random access type, a leading picture associated with the video data is output.

13. The computer system of claim 12, wherein HandleCraAsCvsStartFlag and NoOutputBeforeRecoveryFlag flags for the video data are both set equal to 0.

14. The computer system of claim 13, wherein based on the presence of mixed NAL unit types, a pps_subpic_treated as_pic_flag flag is set equal to 1.

15. A non-transitory computer readable medium having stored thereon a computer program for coding video data, the computer program configured to cause one or more computer processors to:

receive video data comprising one or more subpictures;

identify a network abstraction layer (NAL) unit type associated with each of the one or more subpictures based on checking a flag corresponding to mixed NAL units in the one or more subpictures; and decode the video data based on the identified NAL unit types, wherein a picture with two or more NAL unit types associated with the one or more subpictures is decoded as a trailing picture, and wherein boundaries associated with the one or more subpictures are treated as picture boundaries without loop filtering across the boundaries based on the picture with two or more NAL unit types being associated with the one or more subpictures.

16. The computer readable medium of claim 15, wherein a HandleCraAsCvsStartFlag flag being equal to one indicates a current picture is a start point of a current coded video sequence.

17. The computer readable medium of claim 16, wherein based on a presence of mixed NAL unit types and a video coding layer NAL unit having a clean random access type, the HandleCraAsCvsStartFlag flag and a NoOutputBeforeRecoveryFlag flag for the video data are both set equal to 0.

18. The computer readable medium of claim 17, wherein based on the HandleCraAsCvsStartFlag being set equal to 0, a current subpicture is not be handled as a coded video sequence start picture.

19. The computer readable medium of claim 16, wherein based on a presence of mixed NAL unit types and a video coding layer NAL unit having a clean random access type, a leading picture associated with the video data is output.

20. The computer readable medium of claim 19, wherein HandleCraAsCvsStartFlag and NoOutputBeforeRecoveryFlag flags for the video data are both set equal to 0.

* * * * *